United States Patent
Onuki et al.

(10) Patent No.: US 10,201,740 B2
(45) Date of Patent: Feb. 12, 2019

(54) GOLF CLUB WEIGHT PATTERN DETERMINATION APPARATUS AND RECOMMENDATION APPARATUS

(71) Applicant: DUNLOP SPORTS CO. LTD., Kobe-shi, Hyogo (JP)

(72) Inventors: Masahide Onuki, Kobe (JP); Masaru Kono, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/483,373

(22) Filed: Apr. 10, 2017

(65) Prior Publication Data
US 2017/0291064 A1    Oct. 12, 2017

(30) Foreign Application Priority Data

Apr. 11, 2016 (JP) ................. 2016-078585

(51) Int. Cl.
*A63F 9/24* (2006.01)
*A63F 13/00* (2014.01)
(Continued)

(52) U.S. Cl.
CPC .......... *A63B 69/3638* (2013.01); *A63B 60/02* (2015.10); *A63B 60/42* (2015.10); *A63B 60/46* (2015.10); *A63B 69/3617* (2013.01); *A63B 53/0466* (2013.01); *A63B 60/52* (2015.10); *A63B 71/0622* (2013.01); *A63B 2053/0433* (2013.01); *A63B 2053/0491* (2013.01); *A63B 2069/362* (2013.01); *A63B 2220/34* (2013.01); (Continued)

(58) Field of Classification Search
CPC ....... A63F 7/0628; A63B 60/00; A63B 53/00; A63B 53/69; A63B 53/36; A63B 53/3638
See application file for complete search history.

(56) References Cited

U.S. PATENT DOCUMENTS 3,220,733 A * 11/1965 Saleeby ............. A63B 53/0487
                                                      473/335
4,304,406 A * 12/1981 Cromarty ............... A63B 69/36
                                                      473/225
(Continued)

FOREIGN PATENT DOCUMENTS

| JP | 2014-524343 A | 9/2014 |
|---|---|---|
| JP | 2016-10579 A | 1/2016 |
| WO | WO 2013/028853 A1 | 2/2013 |

*Primary Examiner* — Kevin Y Kim
(74) *Attorney, Agent, or Firm* — Birch, Stewart, Kolasch & Birch, LLP

(57) ABSTRACT

Provided is a weight pattern determination apparatus for determining, in a golf club having a head capable of mounting one or more weights in a plurality of mounting patterns, the mounting pattern suited to a golfer. The apparatus has an impact point specification unit and a pattern determination unit. The impact point specification unit specifies an impact point distribution of the golfer. The pattern determination unit determines a recommended pattern which is the mounting pattern that approximates a sweet area of the golf club to the impact point distribution. According to the first aspect of the present invention, the impact point distribution of the golfer is specified, and a mounting pattern is determined based on this impact point distribution.

20 Claims, 25 Drawing Sheets

(51) Int. Cl.
*G06F 17/00* (2006.01)
*G06F 19/00* (2018.01)
*A63B 69/36* (2006.01)
*A63B 60/02* (2015.01)
*A63B 60/46* (2015.01)
*A63B 60/42* (2015.01)
*A63B 71/06* (2006.01)
*G01B 5/00* (2006.01)
*A63B 53/04* (2015.01)
*A63B 60/52* (2015.01)

(52) U.S. Cl.
CPC ..... *A63B 2220/40* (2013.01); *A63B 2220/806* (2013.01); *A63B 2220/807* (2013.01); *G01B 5/0023* (2013.01)

(56) References Cited

U.S. PATENT DOCUMENTS

| | | | |
|---|---|---|---|
| 4,529,204 A * | 7/1985 | Yamakawa | A63B 69/3632 473/256 |
| 7,736,242 B2 * | 6/2010 | Stites | A63B 69/3614 473/221 |
| 2004/0147342 A1 * | 7/2004 | Lindsay | A63B 53/04 473/342 |

* cited by examiner

GOLF CLUB WEIGHT PATTERN DETERMINATION APPARATUS AND RECOMMENDATION APPARATUS

CROSS REFERENCE TO RELATED APPLICATION

This application claims a priority to Japanese Patent Application No. 2016-078585 filed on Apr. 11, 2016, which is hereby incorporated by reference in its entirety.

FIELD OF INVENTION

The present invention relates to a weight pattern determination apparatus, method and program for determining a mounting pattern suited to a golfer and to a weight pattern recommendation apparatus, method and program for recommending the mounting pattern, in a golf club having a head capable of mounting one or more weights in a plurality of mounting patterns.

BACKGROUND

Heretofore, golf clubs having a head capable of mounting weights in a plurality of mounting patterns are known. For example, JP 2014-524343T (hereinafter called "Patent Literature 1") and JP 2016-010579A (hereinafter called "Patent Literature 2"). With this type of golf club, the center of gravity of the head and, by extension, the position of a sweet area on the face surface of the head, can be adjusted by mounting weights. Note that the sweet area is an area in the vicinity of a sweet spot, and the sweet spot is the foot of a perpendicular that drops down from the center of gravity of the head on the face surface.

SUMMARY of INVENTION

However, when using a golf club head such as described in Patent Literatures 1 and 2, the golfer may have difficulty adjusting the position of the sweet area due to not knowing how the weights should be mounted. Thus, the golfer needs to do things such as taking actual practice swings while changing the weights around in various mounting patterns, and select a mounting pattern that feels suitable.

An object of the present invention is to provide an apparatus, method and program that are capable of determining and/or recommending a mounting pattern of weights suited to a golfer, in a golf club having a head capable of mounting weights in a plurality of mounting patterns.

A weight pattern determination apparatus according to a first aspect of the present invention is an apparatus for determining, in a golf club having a head capable of mounting one or more weights in a plurality of mounting patterns, the mounting pattern suited to a golfer, the apparatus including an impact point specification unit and a pattern determination unit. The impact point specification unit specifies an impact point distribution of the golfer. The pattern determination unit determines a recommended pattern which is the mounting pattern that approximates a sweet area of the golf club to the impact point distribution. Note that the plurality of mounting patterns as referred to here can also include a pattern in which no weights are mounted.

A weight pattern determination apparatus according to a second aspect of the present invention is the weight pattern determination apparatus according to the first aspect that further includes a data acquisition unit. The data acquisition unit acquires measurement data obtained by measuring a swing motion of the golf club by the golfer using a measurement device. The impact point specification unit specifies the impact point distribution, based on the measurement data.

A weight pattern determination apparatus according to a third aspect of the present invention is the weight pattern determination apparatus according to the first aspect or the second aspect, in which the measurement device includes at least one of an angular velocity sensor and an acceleration sensor attached to the golf club.

A weight pattern determination apparatus according to a fourth aspect of the present invention is the weight pattern determination apparatus according to any of the first aspect to the third aspect, in which the impact point specification unit calculates a feature amount of the impact point distribution, and the pattern determination unit determines the recommended pattern, based on the feature amount.

A weight pattern determination apparatus according to a fifth aspect of the present invention is the weight pattern determination apparatus according to the fourth aspect, in which the feature amount includes at least one of a position of the impact point distribution in a toe-heel direction, a position of the impact point distribution in an up-down direction, and a slope of the impact point distribution.

A weight pattern determination apparatus according to a sixth aspect of the present invention is the weight pattern determination apparatus according to any of the first aspect to the fifth aspect, in which the pattern determination unit determines the recommended pattern, with reference to predetermined information for specifying, with regard to each of the plurality of mounting patterns, a position of the sweet area in a case where the mounting pattern is applied.

A weight pattern determination apparatus according to a seventh aspect of the present invention is the weight pattern determination apparatus according to any of the first aspect to the sixth aspect that further includes a display control unit. The display control unit displays, on a display unit, a screen illustrating the head in a state in which the one or more weights are arranged as per the recommended pattern.

A weight pattern determination apparatus according to an eighth aspect of the present invention is the weight pattern determination apparatus according to any of the first aspect to the sixth aspect that further includes a display control unit. The display control unit displays, on a display unit, a screen illustrating the head and illustrating a position of the impact point distribution on the head and a position of the sweet area in a case where the recommended pattern is applied.

A weight pattern recommendation apparatus according to a ninth aspect of the present invention is an apparatus for recommending, in a golf club having a head capable of mounting one or more weights in a plurality of mounting patterns, the mounting pattern suited to a golfer, the apparatus including a first display control unit and a second display control unit. The first display control unit displays, on a display unit, a first diagram illustrating a position of an impact point distribution of the golfer on the head. The second display control unit displays, on the display unit, a second diagram illustrating the head in which the one or more weights are arranged as per a recommended pattern which is the mounting pattern that approximates a sweet area of the golf club to the impact point distribution.

A weight pattern recommendation apparatus according to a tenth aspect of the present invention is the weight pattern recommendation apparatus according to the ninth aspect, in which the first display control unit and the second display control unit overlay and display the first diagram and the second diagram on a same screen.

A weight pattern recommendation apparatus according to an eleventh aspect of the present invention is the weight pattern recommendation apparatus according to the ninth aspect or the tenth aspect that further includes a third display control unit. The third display control unit displays, on the display unit, a third diagram illustrating a position of the sweet area in a case where the recommended pattern in the head is applied.

A weight pattern recommendation apparatus according to a twelfth aspect of the present invention is the weight pattern recommendation apparatus according to the eleventh aspect, in which the first display control unit and the third display control unit overlay and display the first diagram and the third diagram on the same screen.

A weight pattern determination program according to a thirteenth aspect of the present invention is a program for determining, in a golf club having a head capable of mounting one or more weights in a plurality of mounting patterns, the mounting pattern suited to a golfer, the program causing a computer to execute the following steps.
(1) Specifying an impact point distribution of the golfer.
(2) Determining a recommended pattern which is the mounting pattern that approximates a sweet area of the golf club to the impact point distribution, based on the impact point distribution.

A weight pattern determination method according to a fourteenth aspect of the present invention is a method for determining, in a golf club having a head capable of mounting one or more weights in a plurality of mounting patterns, the mounting pattern suited to a golfer, the method including the following steps.
(1) Specifying an impact point distribution of the golfer.
(2) Determining a recommended pattern which is the mounting pattern that approximates a sweet area of the golf club to the impact point distribution, based on the impact point distribution.

A reoccurring theme with golfers is how to get more carry distance. In order to get more carry distance, it is desirable to hit the ball in the sweet area. Accordingly, an improvement in carry distance can be expected if the position of the sweet area of the head can be adjusted in line with the golfer, using a golf club having a head capable of mounting weights in a plurality of mounting patterns.

According to the first aspect of the present invention, the impact point distribution of the golfer is specified, and a mounting pattern is determined based on this impact point distribution. More specifically, a mounting pattern (recommended pattern) that approximates the sweet area of the golf club to the impact point distribution of the golfer is determined. Accordingly, a mounting pattern of weights suited to the golfer can be determined in a golf club having a head capable of mounting weights in a plurality of mounting patterns.

According to the ninth aspect of the present invention, a first diagram illustrating a position of the impact point distribution of the golfer is displayed, and a second diagram illustrating the head in a state in which the weights are arranged as per the recommended pattern is also displayed. Accordingly, a person looking at such a graphical user interface will be able to intuitively perceive their impact point distribution, and will also be able to comprehend the recommended pattern. Accordingly, a mounting pattern of weights suited to the golfer can be recommended, in a golf club having a head capable of mounting weights in a plurality of mounting patterns.

DETAILED DESCRIPTION OF THE PREFERRED EMBODIMENTS

Hereinafter, a weight pattern determination/recommendation apparatus, method, and program according to one embodiment of the present invention will be described, with reference to the drawings.

1. Weight Pattern Determination/Recommendation Apparatus

Figure 1:
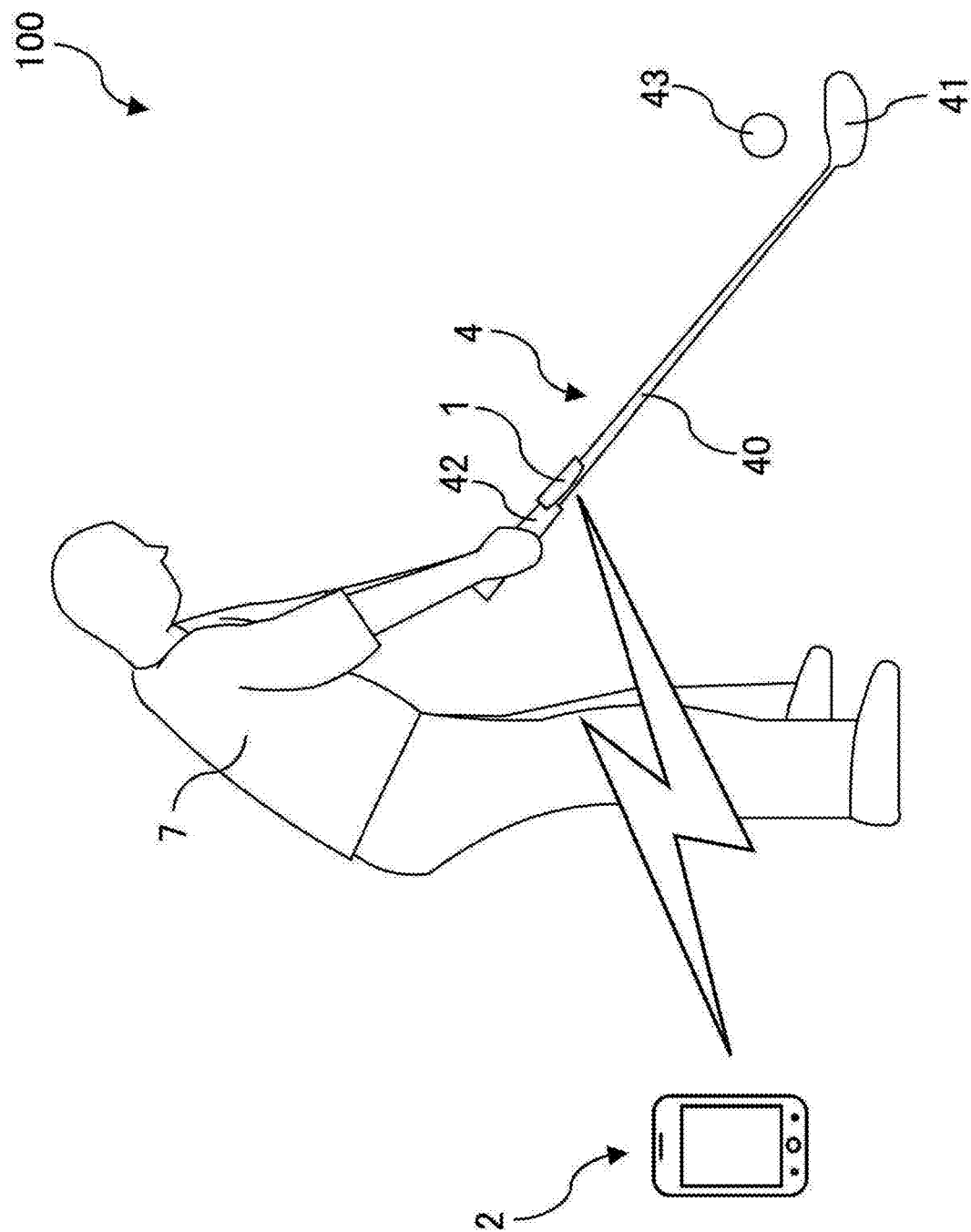
FIG. 1 is a diagram showing a weight pattern determination/recommendation system that is provided with a weight pattern determination/recommendation apparatus according to one embodiment of the present invention.
Figure 2:
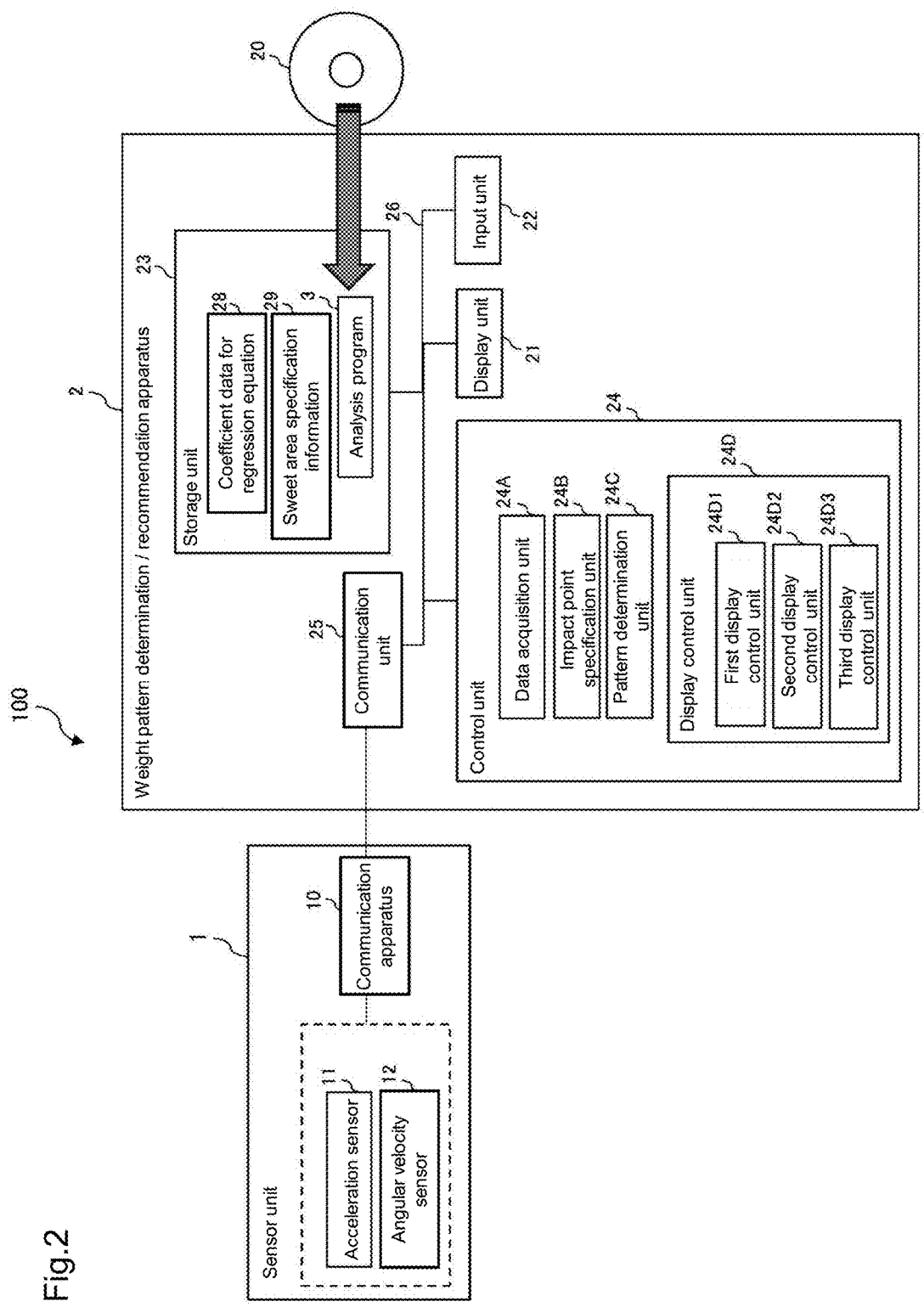
FIG. 2 is a functional block diagram of the weight pattern determination/recommendation system in FIG. 1.
Figure 9:
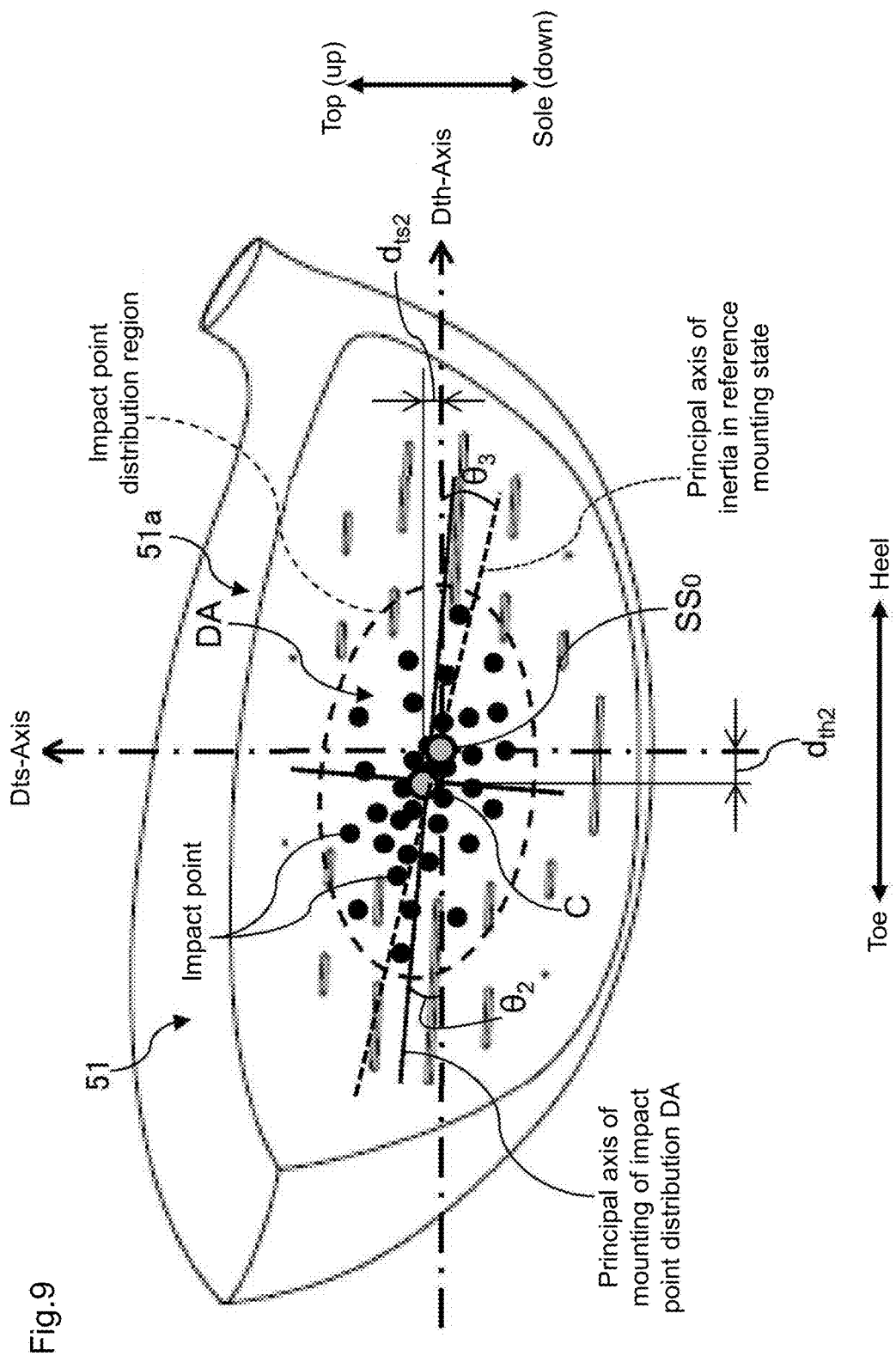
FIG. 9 is a diagram showing the face surface of a head on which an impact point distribution is shown.

FIG. 1 and FIG. 2 show the overall configuration of a weight pattern determination/recommendation system (hereinafter, abbreviated to recommendation system) 100 that is provided with a weight pattern determination/recommendation apparatus (hereinafter, abbreviated to recommendation apparatus) 2 according to the present embodiment. The recommendation apparatus 2 is an apparatus for determining a mounting pattern suited to a golfer 7 and recommending the determined mounting pattern to the golfer 7 as a recommended pattern, in a golf club 4 (see FIG. 4A to FIG. 6) having a head 41 capable of mounting weights W1 to W4 in a plurality of mounting patterns. The golf club 4 is configured such that the center of gravity of the head 41 and, by extension, the position of a sweet area SA on a face surface 51a of the head 41, is adjustable, by adjusting the mounting pattern of the weights W1 to W4 in the head 41. The sweet area SA is a region in the vicinity of a sweet spot SS centered on the sweet spot SS. The sweet spot SS is the foot of a perpendicular that drops down from the center of gravity of the head 41 on the face surface 51a. The recommended pattern that is determined by the recommendation apparatus 2 is a mounting pattern that approximates the sweet area SA (see FIG. 3) of the golf club 4 to an impact point distribution DA (see FIG. 9) that is unique to the golfer 7.

The recommendation apparatus 2 according to the present embodiment has a function of estimating the impact point (impact position) of a golf ball 43 on the face surface 51a of the head 41 when the golfer 7 swings the golf club 4 and hits the golf ball 43. More specifically, in the recommendation system 100, a sensor unit 1 is attached to a shaft 40 of the golf club 4. The recommendation apparatus 2 acquires measurement data of a plurality of swing motions by the golfer 7 measured by the sensor unit 1, and specifies the impact point distribution DA of the golfer 7 based on the acquired measurement data. Information on the specified impact point distribution DA is used in determining the recommended pattern in the recommendation apparatus 2.

Hereinafter, after describing the configurations of the golf club 4, the sensor unit 1, and the recommendation apparatus 2, the flow of processing (hereinafter, weight pattern determination/recommendation processing) for determining a recommended pattern and outputting the recommended pattern as a recommendation will be described.

1-1. Configuration of Golf Club

Figure 3:
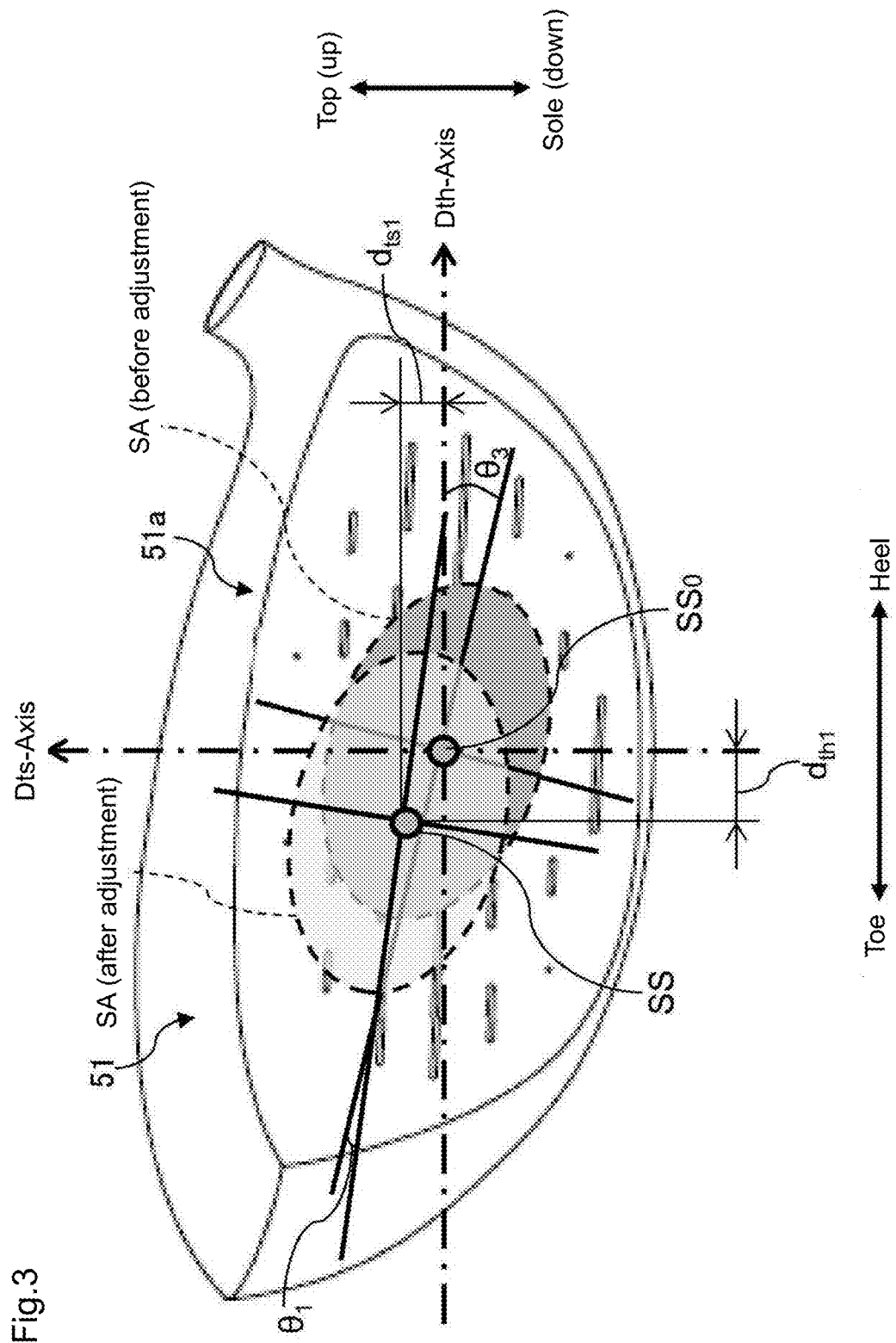
FIG. 3 is a diagram showing a face surface of a head in which a sweet area before and after adjustment is shown.

The golf club 4 according to the present embodiment is constituted by the shaft 40, the head 41 provided at one end of the shaft 40, and a grip 42 provided at the other end of the shaft 40, similarly to a typical golf club. The golf club 4 is, however, configured such that the center of gravity of the head 41 and, by extension, the position of the sweet area SA, is adjustable, by attaching and detaching the weights W1 to W4. FIG. 3 is a diagram showing the sweet area SA before and after adjustment.

Figure 4A:
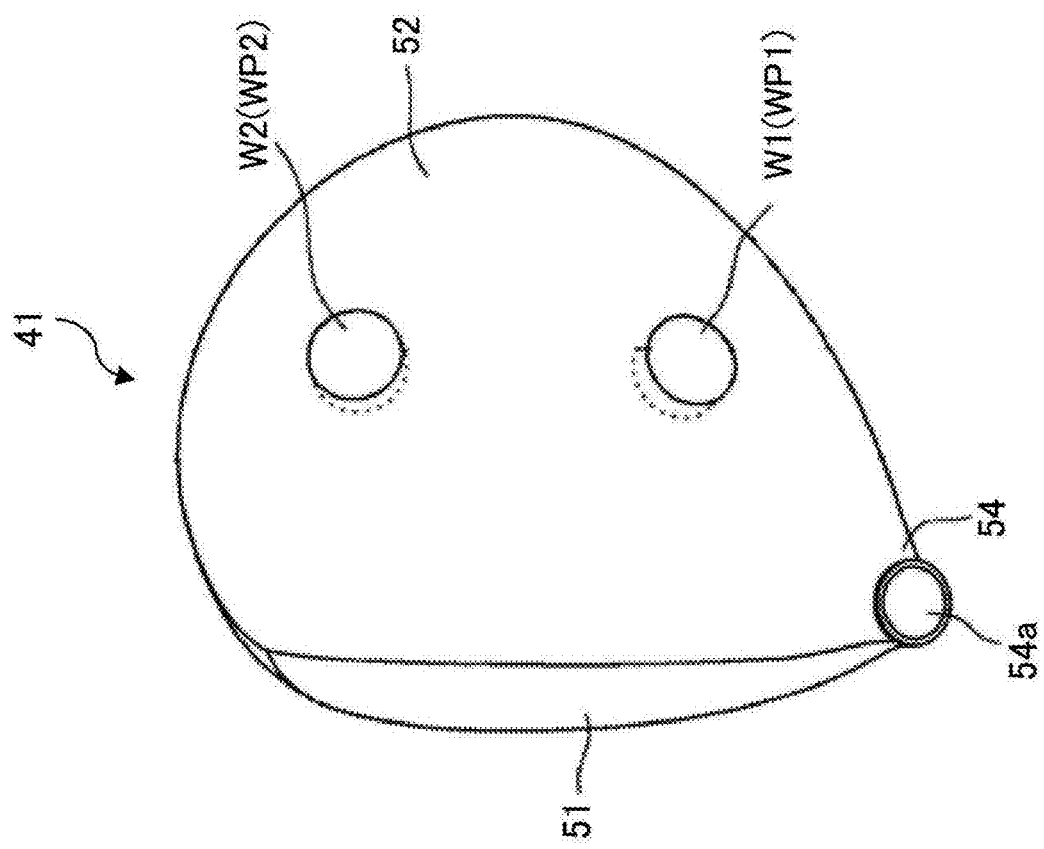
FIG. 4A is a plan view of the head.
Figure 4B:
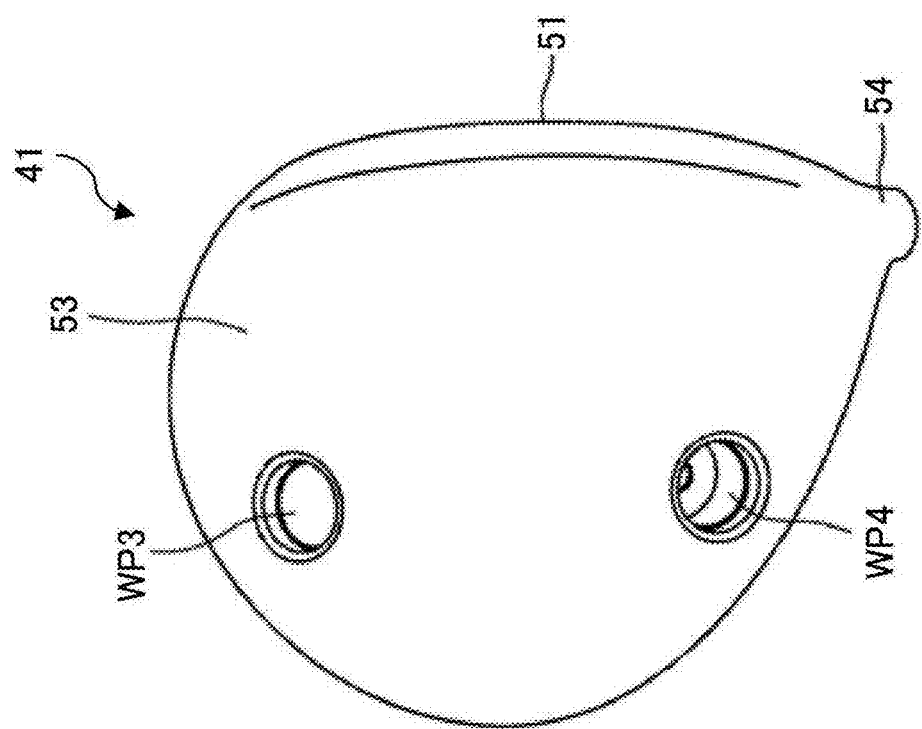
FIG. 4B is a bottom view of the head.

A plan view and a bottom view of the head 41 of the golf club 4 in a reference state are shown in FIG. 4A and FIG. 4B. In FIG. 4B, however, the weights W3 and W4 are omitted and only weight ports WP3 and WP4 for respectively receiving the weights W3 and W4 are illustrated. The reference state will be discussed later. As shown in FIG. 4A and FIG. 4B, the head 41 according to the present embodiment is a wood head, or more specifically, a driver head, but the head 41 can be a utility head, an iron head, a putter head or the like. The head 41 is hollow structure, and a wall surface is formed by a face 51, a crown 52, a sole 53 and a hosel 54.

The face 51 has the face surface 51a for hitting the ball, and constitutes a front portion of the head 41. The crown 52 extends toward the back side from an upper edge of the face 51, and constitutes a top surface of the head 41. The sole 53 extends toward the back sides from the lower edge of the face 51, and constitutes a bottom surface and a side wall of the head 41. The hosel 54 is a region that is provided adjacent to the heel side of the crown 52, and has an insertion hole 54a into which the shaft 40 of the golf club 4 is inserted.

As shown in FIG. 4A, two weight ports WP1 and WP2 are formed in the crown 52. The weight ports WP1 and WP2 are arranged at an interval in the toe-heel direction, with the weight port WP1 being arranged on the heel side and the weight port WP2 being arranged on the toe side. Accordingly, the center of gravity of the head 41 and, by extension, the position of the sweet area SA, can be moved to the heel side, by making the weight W1 that is mounted in the weight port WP1 heavier than the weight W2 that is mounted in the weight port WP2. Conversely, the position of the sweet area SA can be moved to the toe side, by making the weight W1 that is mounted in the weight port WP1 lighter than the weight W2 that is mounted in the weight port WP2.

Also, as shown in FIG. 4B, the two weight ports WP3 and WP4 are formed in the sole 53. The weight ports WP3 and WP4 are arranged at an interval in the toe-heel direction, with the weight port WP3 being arranged on the toe side and the weight port WP4 being arranged on the heel side. Accordingly, the center of gravity of the head 41 and, by extension, the position of the sweet area SA, can be moved to the toe side, by making the weight W3 that is mounted in the weight port WP3 heavier than the weight W4 that is mounted in the weight port WP4. Conversely, the position of the sweet area SA can be moved to the heel side, by making the weight W3 that is mounted in the weight port WP3 lighter than the weight W4 that is mounted in the weight port WP4.

Also, the center of gravity of the head 41 and, by extension, the position of the sweet area SA, can be moved to the upper side, by making the total weight of the weights W1 and W2 that are mounted in the weight ports WP1 and WP2 heavier than the total weight of the weights W3 and W4 that are mounted in the weight ports WP3 and WP4. Conversely, the position of the sweet area SA can be moved to the lower side, by making the total weight of the weights W1 and W2 lighter than the total weight of the weights W3 and W4.

Figure 5:
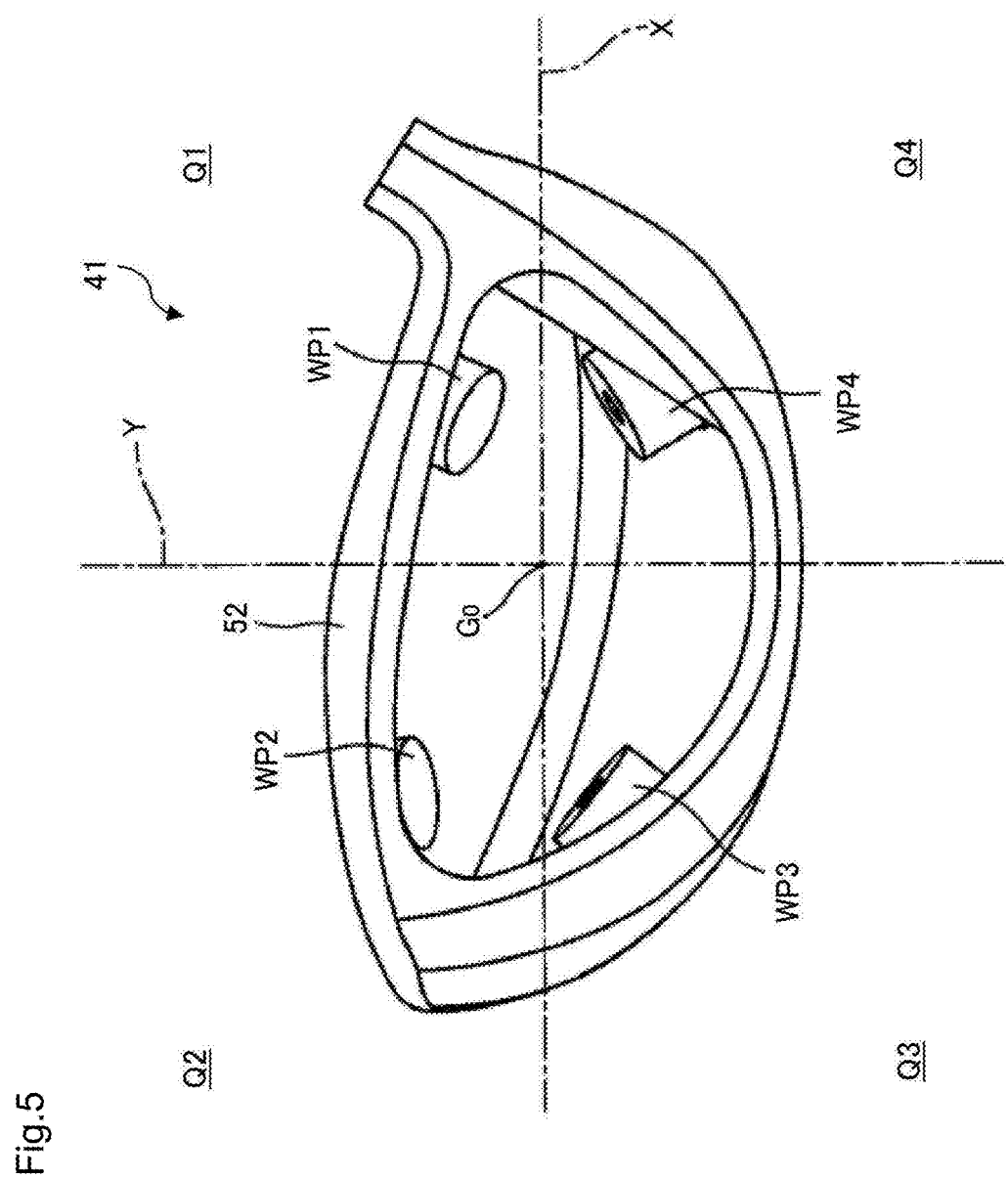
FIG. 5 is a front view showing the inside of the head with the face partially removed.

FIG. 5 is a front view showing the inside of the head 41 with the face 51 partially removed. Here, the axes that pass through a center of gravity $G_0$ of the head 41 in a state in which none of the weights W1 to W4 are mounted (hereinafter, weight unmounted state) and extend in the toe-heel direction and the up-down direction in the reference state are respectively defined as the X-axis and the Y-axis. On the X-axis, the heel side is the positive side and, on the Y-axis, the upper side is the positive side. At this time, in front view, the weight port WP1 exists in a first quadrant Q1, the weight port WP2 exists in a second quadrant Q2, the weight port WP3 exists in a third quadrant Q3, and the weight port WP4 exists in a fourth quadrant Q4.

In the present embodiment, the weight of the weight W1 can be selected from 0 g (in this case, it means that the weight W1 is not attached), 4 g, 8 g or 16 g. This similarly applies to the weights W2 to W4. In the present embodiment, however, the weights are arranged such that the total weight of the weights W1 to W4 will always be 16 g to ensure that the weight of the head 41 is constant. Accordingly, 35 patterns shown in Tables 1 to 4 exist as mounting patterns of the weights W1 to W4 in the head 41.

TABLE 1

| Mounting Pattern | | | P1 | P2 | P3 | P4 | P5 | P6 | P7 | P8 | P9 |
|---|---|---|---|---|---|---|---|---|---|---|---|
| Mounting pattern of weights (g) | Toe side of crown | WP2 | 0 | 4 | 8 | 12 | 16 | 0 | 4 | 0 | 8 |
| | Heel side of crown | WP1 | 0 | 0 | 0 | 0 | 0 | 0 | 0 | 4 | 0 |
| | Toe side of sole | WP3 | 16 | 12 | 8 | 4 | 0 | 12 | 8 | 12 | 4 |
| | Heel side of sole | WP4 | 0 | 0 | 0 | 0 | 0 | 4 | 4 | 0 | 4 |
| Relative position of sweet spot (mm) | Toe-heel direction ($d_{th1}$) | | −2 | −2 | −2 | −2 | −2 | −1 | −1 | −1 | −1 |
| | Up-down direction ($d_{ts1}$) | | −1 | −0.5 | 0 | 0.5 | 1 | −1 | −0.5 | −0.5 | 0 |
| Slope of sweet area (°) | Clockwise in front view ($θ_1$) | | −3 | −2 | 0 | 2 | 3 | −2 | −1 | −3 | 1 |

TABLE 2

| Mounting Pattern | | | P10 | P11 | P12 | P13 | P14 | P15 | P16 | P17 | P18 |
|---|---|---|---|---|---|---|---|---|---|---|---|
| Mounting pattern of weights (g) | Toe side of crown | WP2 | 4 | 12 | 8 | 12 | 0 | 4 | 0 | 8 | 4 |
| | Heel side of crown | WP1 | 4 | 0 | 4 | 4 | 0 | 0 | 4 | 0 | 4 |
| | Toe side of sole | WP3 | 8 | 0 | 4 | 0 | 8 | 4 | 8 | 0 | 4 |
| | Heel side of sole | WP4 | 0 | 4 | 0 | 0 | 8 | 8 | 4 | 8 | 4 |
| Relative position of sweet spot (mm) | Toe-heel direction ($d_{th1}$) | | −1 | −1 | −1 | −1 | 0 | 0 | 0 | 0 | 0 |
| | Up-down direction ($d_{ts1}$) | | 0 | 0.5 | 0.5 | 1 | −1 | −0.5 | −0.5 | 0 | 0 |
| Slope of sweet area (°) | Clockwise in front view ($θ_1$) | | −1 | 3 | 1 | 2 | 0 | 1 | −1 | 3 | 0 |

TABLE 3

| Mounting Pattern | | | P19 | P20 | P21 | P22 | P23 | P24 | P25 | P26 | P27 |
|---|---|---|---|---|---|---|---|---|---|---|---|
| Mounting pattern of weights (g) | Toe side of crown | WP2 | 0 | 8 | 4 | 8 | 0 | 4 | 0 | 4 | 0 |
| | Heel side of crown | WP1 | 8 | 4 | 8 | 8 | 0 | 0 | 4 | 4 | 8 |
| | Toe side of sole | WP3 | 8 | 0 | 4 | 0 | 4 | 0 | 4 | 0 | 4 |
| | Heel side of sole | WP4 | 0 | 4 | 0 | 0 | 12 | 12 | 8 | 8 | 4 |
| Relative position of sweet spot (mm) | Toe-heel direction ($d_{th1}$) | | 0 | 0 | 0 | 0 | 1 | 1 | 1 | 1 | 1 |
| | Up-down direction ($d_{ts1}$) | | 0 | 0.5 | 0.5 | 1 | −1 | −0.5 | −0.5 | 0 | 0 |
| Slope of sweet area (°) | Clockwise in front view ($θ_1$) | | −3 | 1 | −1 | 0 | 2 | 3 | 1 | 2 | −2 |

TABLE 4

| Mounting Pattern | | | P28 | P29 | P30 | P31 | P32 | P33 | P34 | P35 |
|---|---|---|---|---|---|---|---|---|---|---|
| Mounting pattern of weights (g) | Toe side of crown | WP2 | 4 | 0 | 4 | 0 | 0 | 0 | 0 | 0 |
| | Heel side of crown | WP1 | 8 | 12 | 12 | 0 | 4 | 8 | 12 | 16 |
| | Toe side of sole | WP3 | 0 | 4 | 0 | 0 | 0 | 0 | 0 | 0 |

TABLE 4-continued

| Mounting Pattern | | | P28 | P29 | P30 | P31 | P32 | P33 | P34 | P35 |
|---|---|---|---|---|---|---|---|---|---|---|
| | Heel side of sole | WP4 | 4 | 0 | 0 | 16 | 12 | 8 | 4 | 0 |
| Relative position of sweet spot (mm) | Toe-heel direction ($d_{th1}$) | | 1 | 1 | 1 | 2 | 2 | 2 | 2 | 2 |
| | Up-down direction ($d_{ts1}$) | | 0.5 | 0.5 | 1 | −1 | −0.5 | 0 | 0.5 | 1 |
| Slope of sweet area (°) | Clockwise in front view ($\theta_1$) | | −1 | −3 | −2 | 3 | 2 | 0 | −2 | −3 |

The amount of movement of the sweet area SA in the case where the above 35 different mounting patterns are applied is shown in Tables 1 to 4. The amount of movement of the sweet area SA is an amount of movement referenced on a predetermined state (hereinafter, reference mounting state), and, in the example of Tables 1 to 4, is an amount of movement referenced on the state of the mounting pattern P18, that is, a state in which all the weights W1 to W4 within the weight ports WP1 to WP4 are mounted so as be uniform weights. In other words, the amount of movement of the sweet area SA is a relative position of the sweet area SA with respect to the reference mounting state. Also, in the present embodiment, the relative position of the sweet area SA is represented by three indices, namely, a relative position $d_{th1}$ of the sweet spot SS in the toe-heel direction, a relative position $d_{ts1}$ of the sweet spot SS in the up-down direction, and a slope $\theta_1$ of the sweet area SA, as shown in Tables 1 to 4. The slope $\theta_1$ of the sweet area SA is, in the present embodiment, the slope of the principal axis of inertia of the sweet area SA. As mentioned above, the information shown in Tables 1 to 4 is information, regarding each of all the conceivable mounting patterns, for specifying the position of the sweet area SA in the case where that mounting pattern is applied.

The position of the sweet spot SS is preferably adjustable by ±0.5 mm or more in the toe-heel direction, is more preferably adjustable by ±1 mm or more in the toe-heel direction, and is still more preferably adjustable by ±2 mm or more in the toe-heel direction. Instead of or in addition thereto, the position of the sweet spot SS is preferably adjustable by ±0.5 mm or more in the up-down direction, is more preferably adjustable by ±1 mm or more in the up-down direction, and is still more preferably adjustable by ±2 mm or more in the up-down direction. Also, instead of or in addition thereto, the slope of the sweet area SA is preferably adjustable by ±0.5 degrees or more, is more preferably adjustable by ±1 degree or more, is still more preferably adjustable by ±2 degrees or more, and is still more preferably adjustable by ±3 degrees or more.

Figure 6:
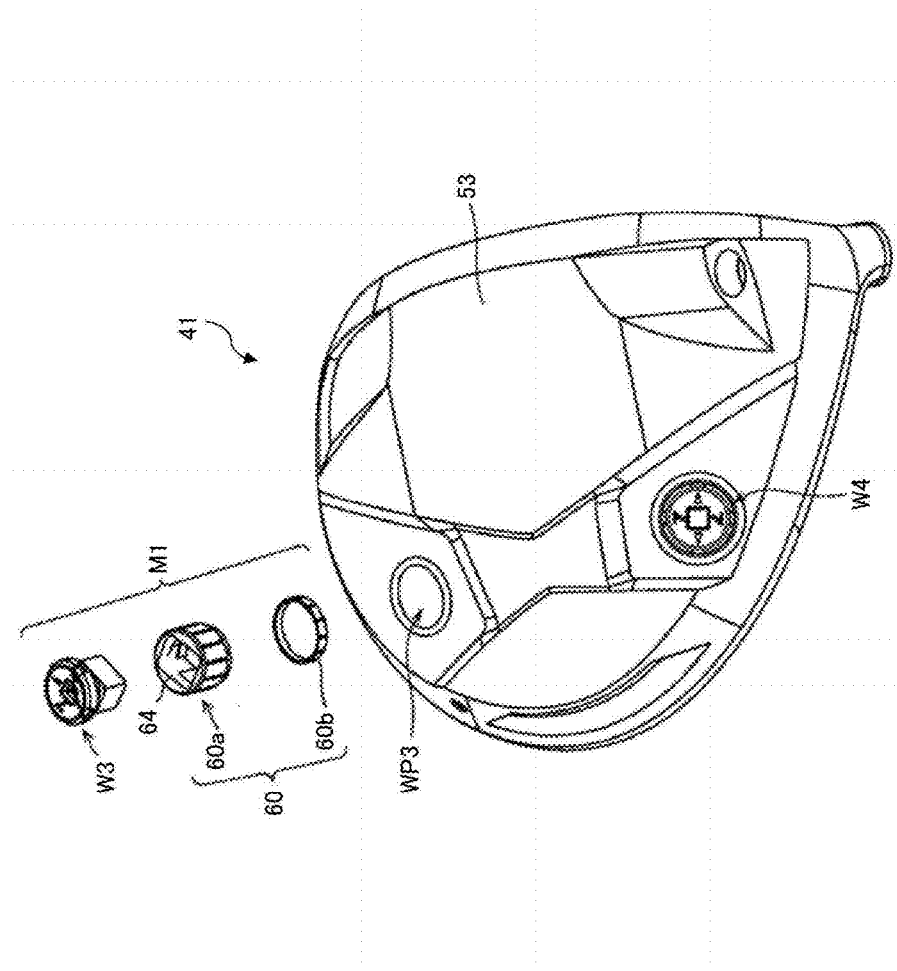
FIG. 6 is a partial exploded perspective view of the head as seen from the sole side;.

FIG. 6 is a perspective diagram of the head 41 as seen from the sole 53 side, and includes an exploded view of a mounting mechanism M1 of the weight W3. The mounting mechanism M1 is provided with a socket 60, apart from the weight W3 and the weight port WP3. The weight port WP3 forms a recessed part in the outer surface of the head 41, and the socket 60 is accommodated in this recessed part. The socket 60 has a main body part 60a and a bottom surface part 60b, and is fixed to the weight port W3 using an adhesive. The main body part 60a is tubular, and a through hole 64 is formed in the middle. When the weight W3 is inserted into this through hole 64 and rotated by a predetermined amount, the weight W3 is fixed to the socket 60 within the weight port WP3. On the other hand, when the weight W3 is rotated in the opposite direction, this fixed state is released, enabling the weight W3 to be removed from the socket 60 within the weight port WP3. Accordingly, the weight W3 is configured to be freely attached and detached with respect to the weight port WP3. This similarly applies to the mounting mechanisms M1 of the remaining weights W1, W2 and W4.

The various configurations related to the weights described above, such as the number, mass and mounting mechanism of the weights are exemplary, and the weights can be arbitrarily configured as long as the center of gravity of the head 41 is adjustable. For example, the number of weight ports and, by extension, the number of weights mountable in the head 41, may be one, two or three, and can also be five or more. Also, the mass of the weight mountable in one weight port may be of one type. Also, the mounting mechanism of the weights can be a screw-type mounting mechanism.

1-2. Configuration of Sensor Unit

Figure 7:
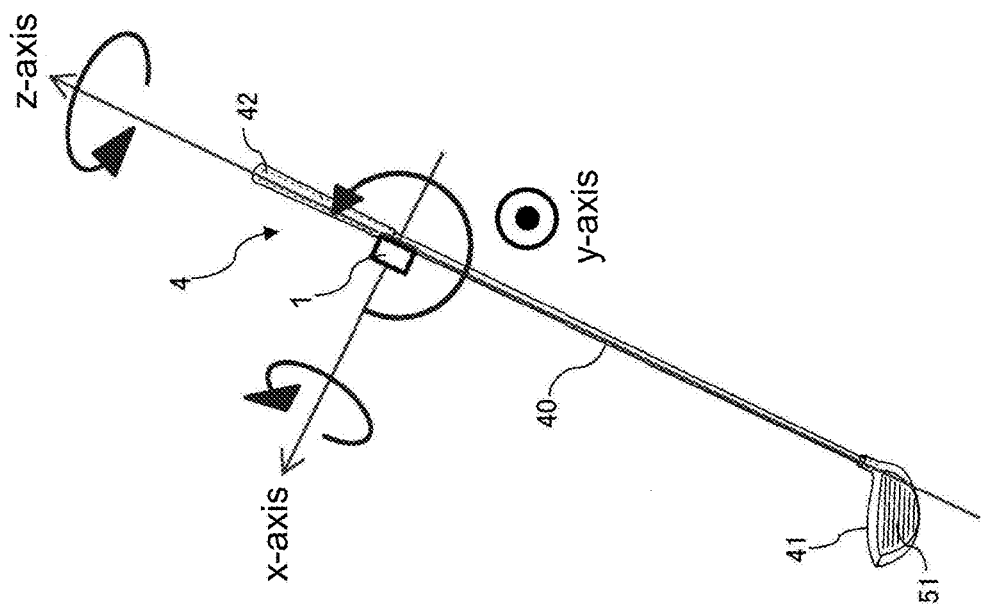
FIG. 7 is a diagram illustrating an xyz local coordinate system referenced on the vicinity of a grip of a golf club.

The sensor unit 1 is attached in the vicinity of the grip 42 on the shaft 40 of the golf club 4, as shown in FIG. 1 and FIG. 7, and measures the behavior of the attachment position, that is, the approximately behavior of the grip 42. The sensor unit 1 according to the present embodiment is configured to be freely attached and detached, and can be attached to an arbitrary golf club 4. The sensor unit 1 is configured to be compact and lightweight, so as to not interfere with the swing motion. As shown in FIG. 2, an accelerometer 11 and an angular velocity sensor 12 are installed in the sensor unit 1 according to the present embodiment. Also, a communication apparatus 10 for transmitting measurement data that is output from these sensors 11 and 12 to the external recommendation apparatus 2 is also installed in the sensor unit 1. Note that, in the present embodiment, the communication apparatus 10 is a wireless communication apparatus so as to not interfere with the swing motion, but may be configured to connect to the recommendation apparatus 2 in a wired manner via a cable.

The accelerometer 11 and the angular velocity sensor 12 respectively measure acceleration and angular velocity in the xyz local coordinate system. More specifically, the accelerometer 11 measures accelerations $a_x$, $a_y$ and $a_z$ in the x-axis, y-axis and z-axis directions. The angular velocity sensor 12 measures angular velocities $\omega_x$, $\omega_y$ and $\omega_z$ about the x-axis, the y-axis and the z-axis. This measurement data is acquired as time series data at a predetermined sampling period Δt. Note that the xyz local coordinate system is a three-axis orthogonal coordinate system that is defined as shown in FIG. 7. That is, the z-axis coincides with the direction in which the shaft 40 extends, and the direction toward the grip 42 from the head 41 is a z-axis positive direction. The y-axis is oriented so as to be aligned as closely as possible with the ball flight direction at the time of the address of the golf club 4, that is, so as to be roughly aligned with the face-back direction. The x-axis is oriented so as to be orthogonal to the y-axis and the z-axis, that is, so as to be roughly in the toe-heel direction, and the direction toward the toe side from the heel side is an x-axis positive direction. Accordingly, the x-axis and the z-axis will be contained in a plane that is roughly parallel to the face surface 51a.

Note that the toe-heel direction, the face-back direction and the top-sole direction are defined on the basis of a reference state. The reference state is a state in which the direction in which the shaft 40 extends in contained in a plane (hereinafter, reference perpendicular plane) that is perpendicular to the horizontal plane, and the head 41 is placed on the horizontal plane at a predetermined lie angle and loft angle. The predetermined lie angle and loft angle are described in the product catalog, for example. The direction of the line of intersection of the reference perpendicular plane and the horizontal plane is the toe-heel direction, and the direction perpendicular to this toe-heel direction and parallel to the horizontal plane direction is the face-back direction. Also, the direction perpendicular to the horizontal plane is referred to as the top-sole direction. Note that, in the description of the present embodiment, unless particularly stated otherwise, "up/down" means the top-sole direction, with the top side being up and the sole side being down.

In the present embodiment, the measurement data from the accelerometer 11 and the angular velocity sensor 12 is transmitted to the recommendation apparatus 2 in real time via the communication apparatus 10. However, a configuration may be adopted in which, for example, the measurement data is stored in a storage device within the sensor unit 1, and the stored measurement data is taken from the storage device after the end of the swing motion and delivered to the recommendation apparatus 2.

1-3. Configuration of Recommendation Apparatus

The configuration of the recommendation apparatus 2 will be described, with reference to FIG. 2. The recommendation apparatus 2, in terms of hardware, is a general-purpose personal computer, and is realized, for example, as a tablet computer, a smartphone, a laptop computer or a desktop computer. The recommendation apparatus 2 is manufactured by installing an analysis program 3 in a general-purpose computer from a computer-readable recording medium 20 such as CD-ROM or a USB memory or via a network such as the Internet. The analysis program 3 is a weight pattern determination/recommendation program according to the present embodiment, and is software for determining a recommended pattern, which is a mounting pattern of the weights. W1 to W4 suited to the golfer 7. A function of estimating the impact point on the face surface 51a based on the measurement data that is sent from the sensor unit 1 is packaged in the analysis program 3. The analysis program 3 executes operations which will be discussed later in the recommendation apparatus 2.

The recommendation apparatus 2 is provided with a display unit 21, an input unit 22, a storage unit 23, a control unit 24, and a communication unit 25. These units 21 to 25 are connected via a bus line 26 and can communicate with each other. In the present embodiment, the display unit 21 is constituted by a liquid crystal display or the like, and displays information which will be discussed later to a user. Note that a user as referred to here is a general term for a person who requires analysis results, such as the golfer 7 or his or her instructor. Also, the input unit 22 can be constituted by a mouse, a keyboard, a touch panel and the like, and accepts operations on the recommendation apparatus 2 from the user.

The storage unit 23 is constituted by a nonvolatile storage device such as a flash memory or a hard disk. The measurement data that is sent from the sensor unit 1 is saved to the storage unit 23, apart from the analysis program 3 being stored therein. Also, in the storage unit 23 is stored data (hereinafter, coefficient data) 28 indicating the coefficients of a regression equation that is used in impact point estimation. The coefficient data 28 will be discussed in detail later. Also, in the storage unit 23 is stored the information shown in Tables 1 to 4, that is, predetermined information (hereinafter, sweet area specification information) 29 for specifying the position of the sweet area SA in the case where mounting patterns P1 to P35 are applied. The communication unit 25 is a communication interface that enables communication between the recommendation apparatus 2 and an external apparatus, and receives data from the sensor unit 1.

The control unit 24 can be constituted by a CPU, a ROM, a RAM and the like. The control unit 24 operates in a virtual manner as a data acquisition unit 24A, an impact point specification unit 24B, a pattern determination unit 24C, and a display control unit 24D (first to third display control units 24D1 to 24D3), by reading out and executing the analysis program 3 that is stored in the storage unit 23. The operation of the units 24A to 24D and 24D1 to 24D3 will be discussed in detail later.

2. Weight Pattern Determination/Recommendation Processing

Figure 8:
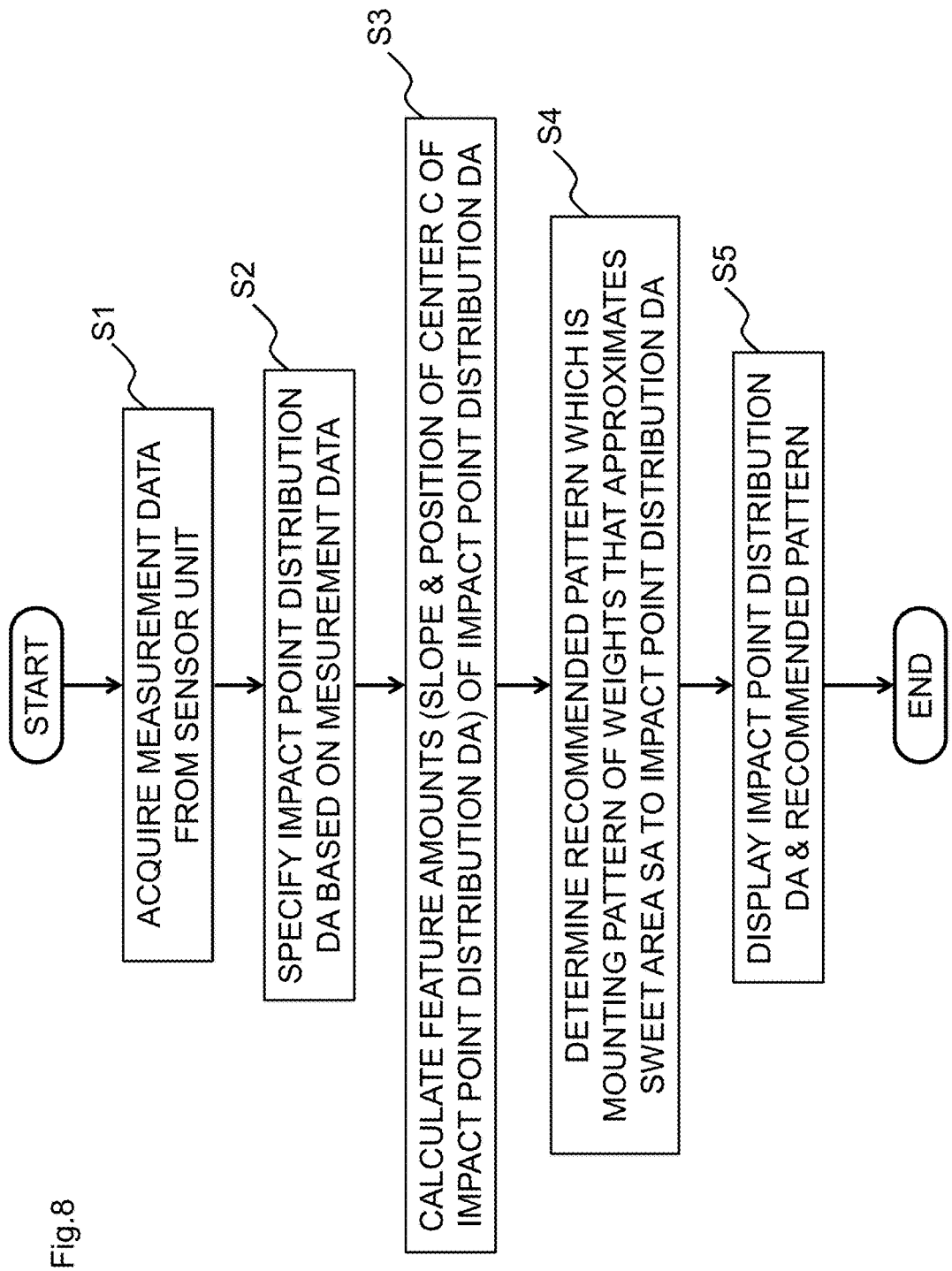
FIG. 8 is a flowchart showing the flow of weight pattern determination/recommendation processing.

Next, weight pattern determination/recommendation processing by the recommendation apparatus 2 will be described, with reference to FIG. 8. This processing includes processing for estimating the impact point, utilizing the vibrations of the golf club 4 that occur when the ball 43 is hit and are detected with the sensor unit 1.

First, in step S1, measurement data that is output from the sensor unit 1 is collected. More specifically, the golf club 4 with the abovementioned sensor unit 1 is swung by the golfer 7 a large number of times. At this time, the large number of swing motions is measured by the sensor unit 1, and measurement data of the accelerations $a_x$, $a_y$ and $a_z$ and the angular velocities $\omega_x$, $\omega_y$, and $\omega_z$ during the golf swing is detected. Also, this measurement data is transmitted to the recommendation apparatus 2 via the communication apparatus 10 of the sensor unit 1. On the other hand, on the recommendation apparatus 2 side, the data acquisition unit 24A receives this data via the communication unit 25, and stores the received data in the storage unit 23. In the present embodiment, at least time series measurement data from address to finish is collected.

Note that the swing motion of a golf club generally proceeds in order of address, top, impact and finish. Address means the initial state in which the head 41 of the golf club 4 is arranged near the ball 43, and top means the state in which the golf club 4 is taken back from address and the head 41 is swung back the furthest. Impact means the state of the moment that the head 41 impacts the ball 43 after the golf club 4 is swung down from top, and finish means the state where the golf club 4 is swung through to the front after impact.

In the following step S2, the impact point specification unit 24B specifies the impact point distribution DA of the golfer 7, by estimating the impact point at the time of each swing motion, based on the measurement data obtained at step S1. In the present embodiment, coordinates ($D_{th}$, $D_{ts}$) of the impact point referenced on a $D_{th}$-$D_{ts}$ plane shown in FIG. 9 that is defined on the face surface 51a are calculated as the coordinates of the impact point. The origin of the $D_{th}$-$D_{ts}$ plane is at a sweet spot $SS_0$, which is the sweet spot SS in the reference mounting state. A $D_{th}$-axis extends in the toe-heel direction, and the direction toward the heel side from the toe side is a $D_{th}$-axis positive direction. Also, a $D_{ts}$-axis extends in the top-sole direction, and the direction toward the top side from the sole side is a $D_{ts}$ axis positive direction. The algorithm used for impact point estimation will be discussed later.

In the following step S3, the impact point specification unit 24B calculates feature amounts of the impact point distribution DA specified at step S2. The feature amounts of the impact point distribution DA are indices representing positions of the impact point distribution DA, and, in the present embodiment, there are three, namely, a position $d_{th2}$ in the toe-heel direction of the impact point distribution DA, a position $d_{ts2}$ in the up-down direction of the impact point distribution DA, and a slope $\theta_2$ of the impact point distribution DA. Also, in the present embodiment, the position $d_{th2}$ of the impact point distribution DA in the toe-heel direction is calculated as the $D_{th}$ coordinate of a center C of the impact point distribution DA, and the position $d_{ts2}$ of the impact point distribution DA in the up-down direction is calculated as the $D_{ts}$ coordinate of the center C of the impact point distribution DA. The $D_{th}$ coordinate and the $D_{ts}$ coordinate of the center C can, for example, also respectively be the average values of the $D_{th}$ coordinates and the $D_{ts}$ coordinates of all the impact points specified at step S2, or respectively be the modes of histograms of the $D_{th}$ coordinates and the $D_{ts}$ coordinates of all the impact points specified at step S2. Note that the position $(d_{th2}, d_{ts2})$ of the center C of the impact point distribution DA that is calculated here is represented as coordinates in the $D_{th}$-$D_{ts}$ plane whose origin is the sweet spot $SS_0$, and is thus a relative position with respect to the sweet spot $SS_0$, that is, a relative position with respect to the reference mounting state.

The impact points of a golfer generally have a tendency to be distributed within a substantially elliptical region that slopes downward from toe to heel. The slope $\theta_2$, which is a feature amount of the impact point distribution DA, corresponds to the slope of the long axis of this substantially elliptical region, and can also be said to be the slope of the direction in which the impact points are most widely distributed. In the present embodiment, the slope of the principal axis of inertia of the impact point distribution DA is calculated as the slope $\theta_2$ of the impact point distribution DA. The slope of the principal axis of inertia can be calculated by taking each impact point as unit mass and deriving the moment of inertia of all the impact points. Note that the slope $\theta_2$ can also be calculated as the slope of a regression line of all the impact points that is obtained by the least-squares method. The slope $\theta_2$ of the impact point distribution DA is calculated by taking a clockwise angle as positive with respect to the $D_{th}$-axis.

In the following step S4, the pattern determination unit 24C determines a recommended pattern which is a mounting pattern of the weights W1 to W4 that approximates the sweet area SA of the golf club 4 to the impact point distribution DA specified at step S2. The recommended pattern is selected based on the feature amounts of the impact point distribution DA calculated at step S3, from among all the conceivable mounting patterns P1 to P35.

More specifically, at step S4, the sweet area specification information 29 in the storage unit 23, which is the information shown in Tables 1 to 4, is referenced. As already mentioned, information representing the relative position $(d_{th1}, d_{ts1})$ of the sweet spot SS in the mounting patterns P1 to P35 with respect to the position of the sweet spot $SS_0$ is included in the sweet area specification information 29. On the other hand, information on the position $(d_{th2}, d_{ts2})$ of the center C of the impact point distribution DA with respect to the position of the sweet spot $SS_0$ is included in the information on the feature amounts of the impact point distribution DA calculated at step S3. Accordingly, in order to approximate the sweet area SA to the impact point distribution DA, it is sufficient to select, from among the mounting patterns P1 to P35, a mounting pattern in which the position $(d_{th2}, d_{ts2})$ of the center C of the impact point distribution DA calculated at step S3 and the relative position $(d_{th1}, d_{ts1})$ of the sweet spot SS that is defined within the sweet area specification information 29 have a high degree of coincidence. For example, if the coordinates of the position of the center C calculated at step S3 are (1.2, −0.70), the mounting patterns P24 and P25 in which the relative position of the sweet spot SS is (1, −0.5) and the mounting pattern P23 in which the relative position of the sweet spot SS is (1, −1) can be selected.

In the case where there exist a plurality of mounting patterns in which $(d_{th1}, d_{ts1})$ and $(d_{th2}, d_{ts2})$ have a high degree of coincidence, these candidates are narrowed down to a mounting pattern in which a slope $(\theta_2-\theta_3)$ obtained by reducing the slope $\theta_2$ of the impact point distribution DA calculated at step S3 so as to be referenced on the reference mounting state and a slope $\theta_1$ of the sweet area SA that is defined in the sweet area specification information 29 have a high degree of coincidence, and that mounting pattern is determined as the recommended pattern. Note that, here, the slope $\theta_3$ of the impact point distribution DA that is referenced on the toe-heel direction in the reference mounting state is stored in advance in the storage unit 23.

In the present embodiment, as described above, the recommended pattern is determined with priority given to $(d_{th1}, d_{ts1})$ and $(d_{th2}, d_{ts2})$ having a high degree of coincidence over a slope $\theta_1$ and $(\theta_2-\theta_3)$ having a high degree of coincidence. However, this priority order may be reversed. Also, a configuration may be adopted in which, for example, an equation for calculating the degree of coincidence that is represented quantitatively and in which each of the indices is weighted, such as the following equation, is defined, and a mounting pattern in which the value given by this equation is small is selected as the recommended pattern. Note that $p_1$ to $p_3$ are weight coefficients.

$$\text{(Degree of Coincidence)} = p_1|d_{th1}-d_{th2}|+p_2|d_{ts1}-d_{ts2}|+p_3|\theta_1-(\theta_2-\theta_3)|$$

Figure 10:
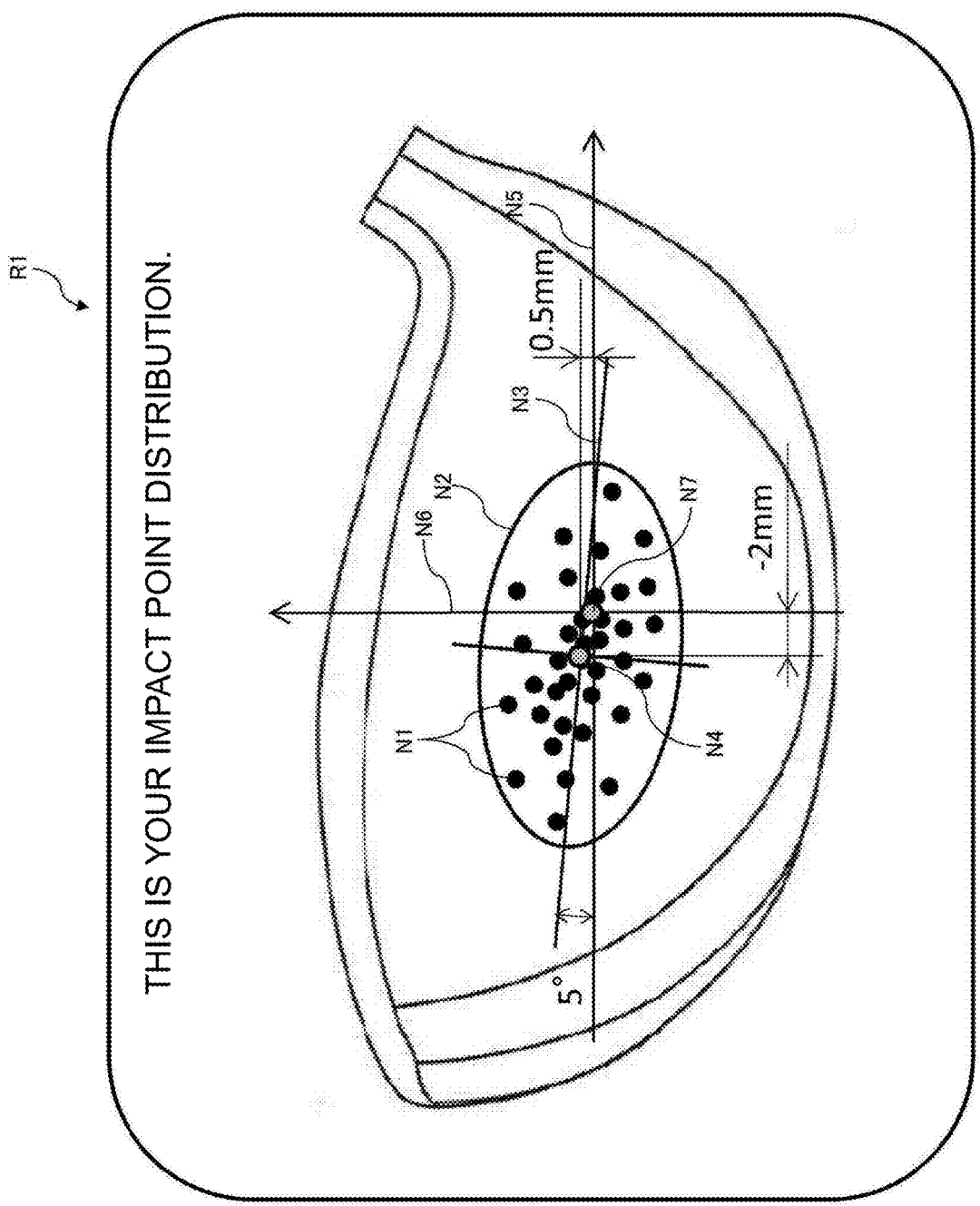
FIG. 10 is an exemplary screen illustrating the impact point distribution.

In the following step S5, the display control unit 24D displays various screens R1 to R3 that inform the user about the impact point distribution DA and the recommended pattern on the display unit 21, based on the above computation result. Specifically, first, the first display control unit 24D1 creates the screen R1 (see FIG. 10) illustrating the position of the impact point distribution of the golfer 7 on the head 41, and displays the screen R1 on the display unit 21. In the example of FIG. 10, on the screen R1, a diagram in which dot-like graphics N1 indicating the impact points are overlaid at a plurality of positions corresponding to actual impact points at the time of the swing motion performed by the golfer 7 is displayed on a diagram of the face surface 51a of the head 41 as seen from the front side. Further, on the screen R1, an elliptical graphic N2 surrounding the plurality of graphics N1, a linear graphic N3 indicating the principal axis of inertia of the impact point distribution DA, and a dot-like graphic N4 indicating the center C of the impact point distribution DA are also overlaid and displayed. The golfer 7 is thereby able to intuitively grasp the position of his or her own impact point distribution DA. Further, on the screen R1, a linear graphic N5 indicating the $D_{th}$-axis, a linear graphic N6 indicating the $D_{ts}$-axis, and a dot-like graphic N7 indicating the sweet spot $SS_0$ are also overlaid and illustrated. Note that "overlaid" as referred to here does not mean only a layer structure in which a plurality of images are superimposed, but can also mean a single image stored in advance in the storage unit 25. The golfer 7 is thereby able to intuitively grasp the extent to which his or her own impact point distribution DA deviates from the sweet area $SS_0$ in the reference mounting state. Also, on the screen R1, a distance (i.e., the coordinates $d_{th2}$, $d_{ts2}$ of the center C) in the toe-heel direction and the up-down direction between the sweet spot $SS_0$ and the center C of the impact point distribution DA, and a slope (e.g., slope $\theta_2$ with respect to the toe-heel direction) of the principal axis of inertia of the impact point distribution DA are displayed as character (including numerical values) information. The user is thereby able to quantitatively grasp the shift of the impact point distribution DA from the sweet area in the reference mounting state.

Figure 11:
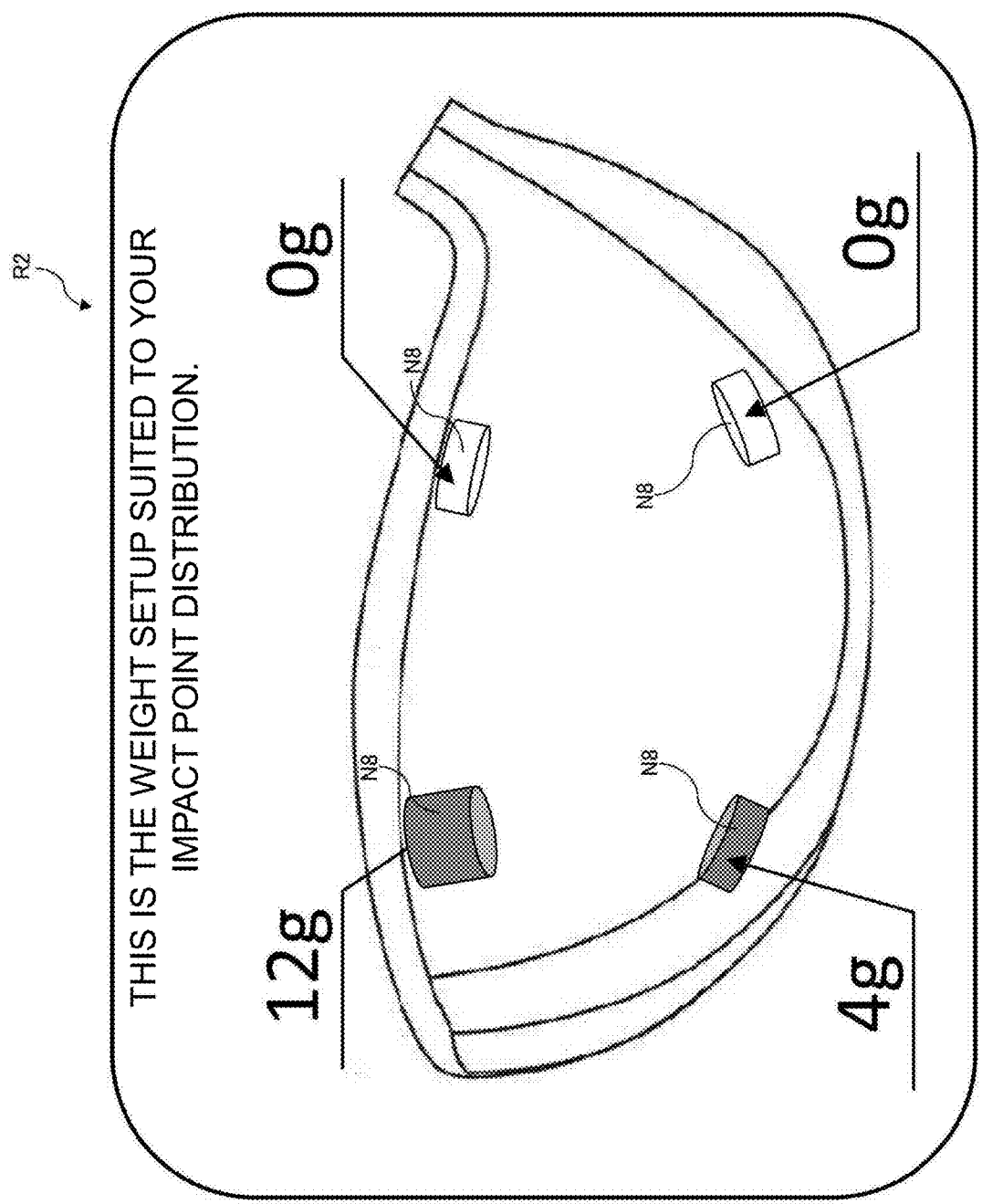
FIG. 11 is an exemplary screen illustrating a recommended pattern.

Also, the second display control unit 24D2, in response to receiving input to change the screen from the user, creates the screen R2 (see FIG. 11) illustrating the head 41 in which the weights W1 to W4 are arranged as per the recommended pattern, and displays the screen R2 on the display unit 21. In the example of FIG. 11, on the screen R2, a diagram in which graphics N8 of the weights W1 to W4 is overlaid on positions corresponding to the weight ports WP1 to WP4 is displayed on a diagram of the head 41 as seen from the front side. Also, the graphics N8 of the weights W1 to W4 are preferably graphics that reflect the respective weights, such that the user is able to intuitively understand the weight of the weights W1 to W4. For example, the graphics can be made bigger or darker in color the heavier the weights. Also, on the screen R2, the weight of the weights W1 to W4 can be displayed as character (including numerical values) information, such that the user can easily quantitatively grasp the weight of the weights W1 to W4. The golfer 7 is thereby able to receive advice about arrangement of weights suited to himself or herself.

Figure 12:
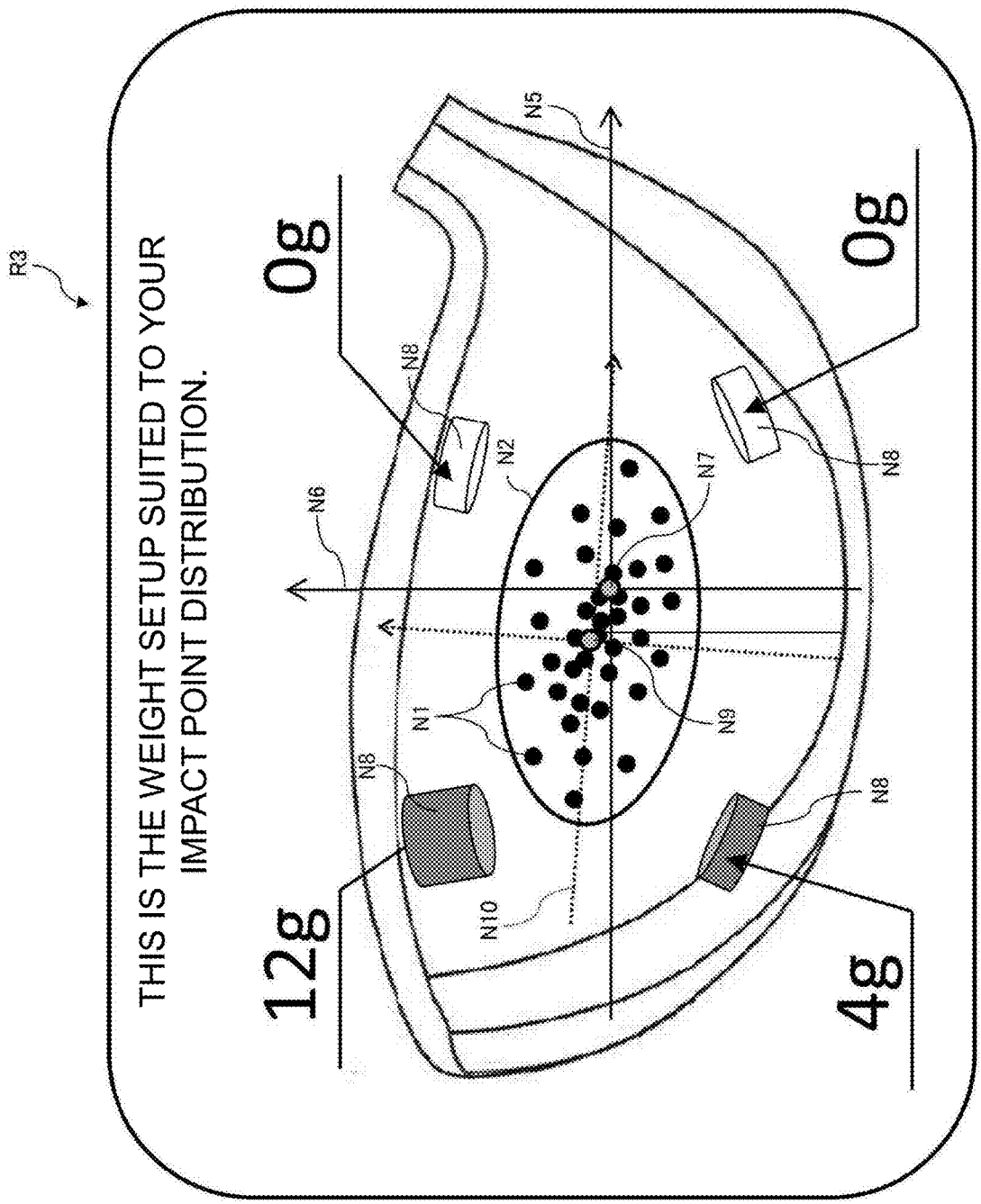
FIG. 12 is an exemplary screen illustrating a positional relationship between the impact point distribution and the sweet area after adjustment.

Furthermore, the third display control unit 24D3, in response to receiving input to change the screen from the user, creates graphics N9 and N10 indicating the position of the sweet area SA in the case where the recommended pattern is applied, as shown in FIG. 12, and displays the graphics N9 and N10 on the display unit 21. The screen of FIG. 12 is a screen on which the graphics N9 and N10 are overlaid and displayed on a diagram of the head 41 as seen from the front side, in addition to the graphics N1, N2 and N5 to N8 created by the first display control unit 24D1 and the second display control unit 24D2. Note that although omitted in the example of FIG. 12, the graphic N3 and/or the graphic N4 can also be overlaid and displayed. The graphic N9 is a dot-like graphic, on the diagram of the head 41, that is arranged at a position corresponding to the sweet spot SS in the case where the recommended pattern is applied and indicates the sweet spot SS. Also, the graphic N10 is a linear graphic, on the diagram of the head 41, that is arranged at a position corresponding to the principal axis of inertia of the sweet area SA in the case where the recommended pattern is applied and indicates the principal axis of inertia. The golfer 7 is thereby able to intuitively grasp how close his or her own impact point distribution DA will come to the sweet area SA by employing the recommended pattern. This ends the weight pattern determination/recommendation processing.

2-1. Impact Point Estimation Processing

Figure 13:
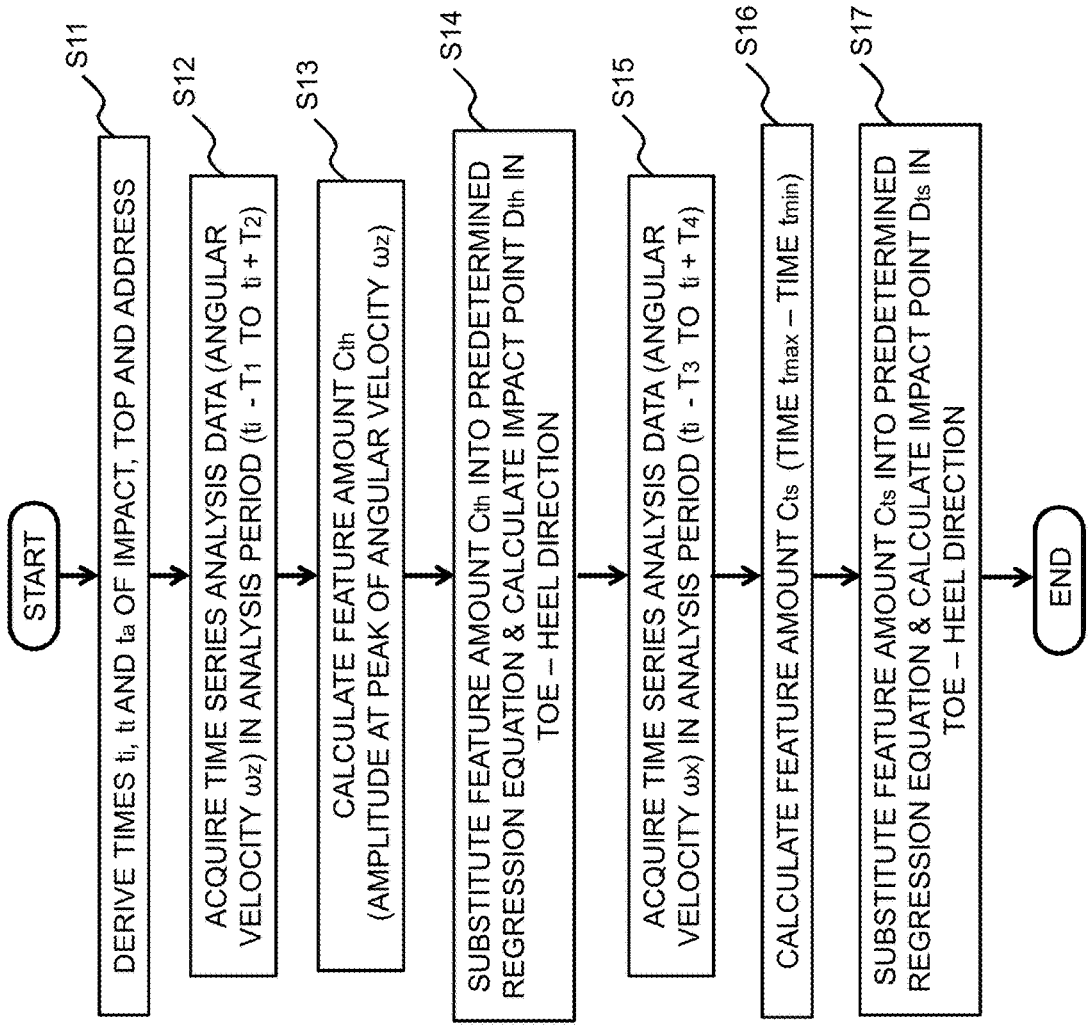
FIG. 13 is a flowchart showing the flow of impact point estimation processing.

Hereinafter, the impact point estimation processing that is executed during step S2 will be described, with reference to FIG. 13. The impact point estimation processing shown in FIG. 13 is processing for estimating one impact point, and is repeatedly executed for the number of swing motions carried out by the golfer 7, or in other words, for the number of impact points that are to be calculated.

In step S11, the impact point specification unit 24B derives times $t_i$, $t_t$ and $t_a$ of impact, top and address, based on the measurement data. Note that since there are various well-known algorithms for calculating the times $t_i$, $t_t$ and $t_a$ of impact, top and address based on measurement data such as angular velocity data, a detailed description is omitted here.

In the following step S12, the impact point specification unit 24B derives time series data (analysis data) of the angular velocity $\omega_z$ in an analysis period close to impact from the measurement data that is stored in the storage unit 23. An analysis period as referred to here is, in the present embodiment, a period from (time of impact $t_i$-$T_1$) to (time of impact $t_i$+$T_2$). For example, $T_1$=1 ms and $T_2$=15 ms can be given. Note that the analysis period may be a period from time of impact t, or may be a period after time of impact $t_i$.

In the following step S13, the impact point specification unit 24B calculates a feature amount $C_{th}$ of a waveform of the analysis data of step S12 that is used in estimating an impact point $D_{th}$ of the ball 43 on the face surface 51a in the toe-heel direction. The feature amount $C_{th}$, according to the present embodiment is the amplitude at the peak of the waveform of the analysis data of step S12.

Figure 14A:
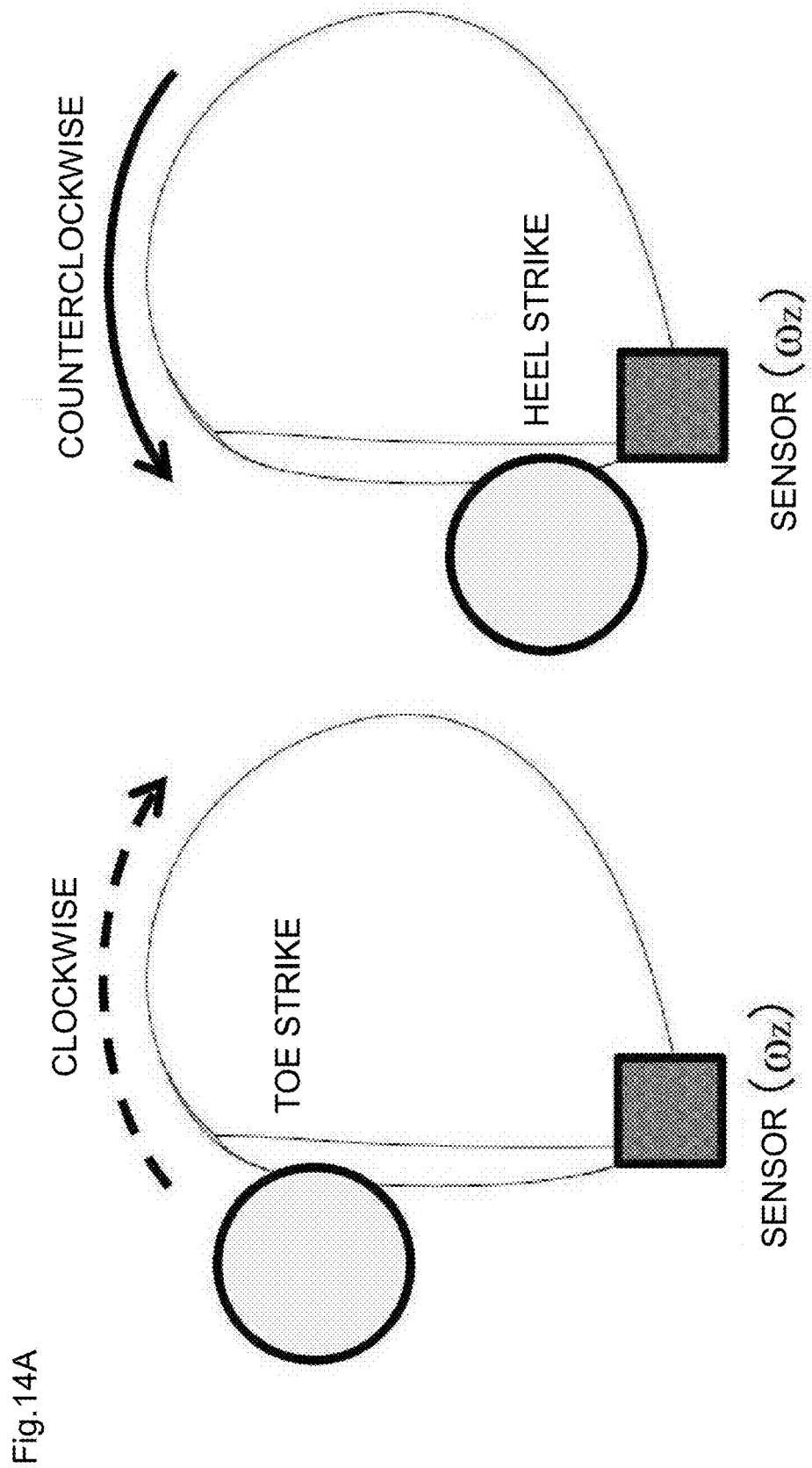
FIGS. 14A and 14B are diagrams illustrating the relationship between the impact point in the toe-heel direction and the amplitude of angular velocity about the z-axis.
Figure 14B:
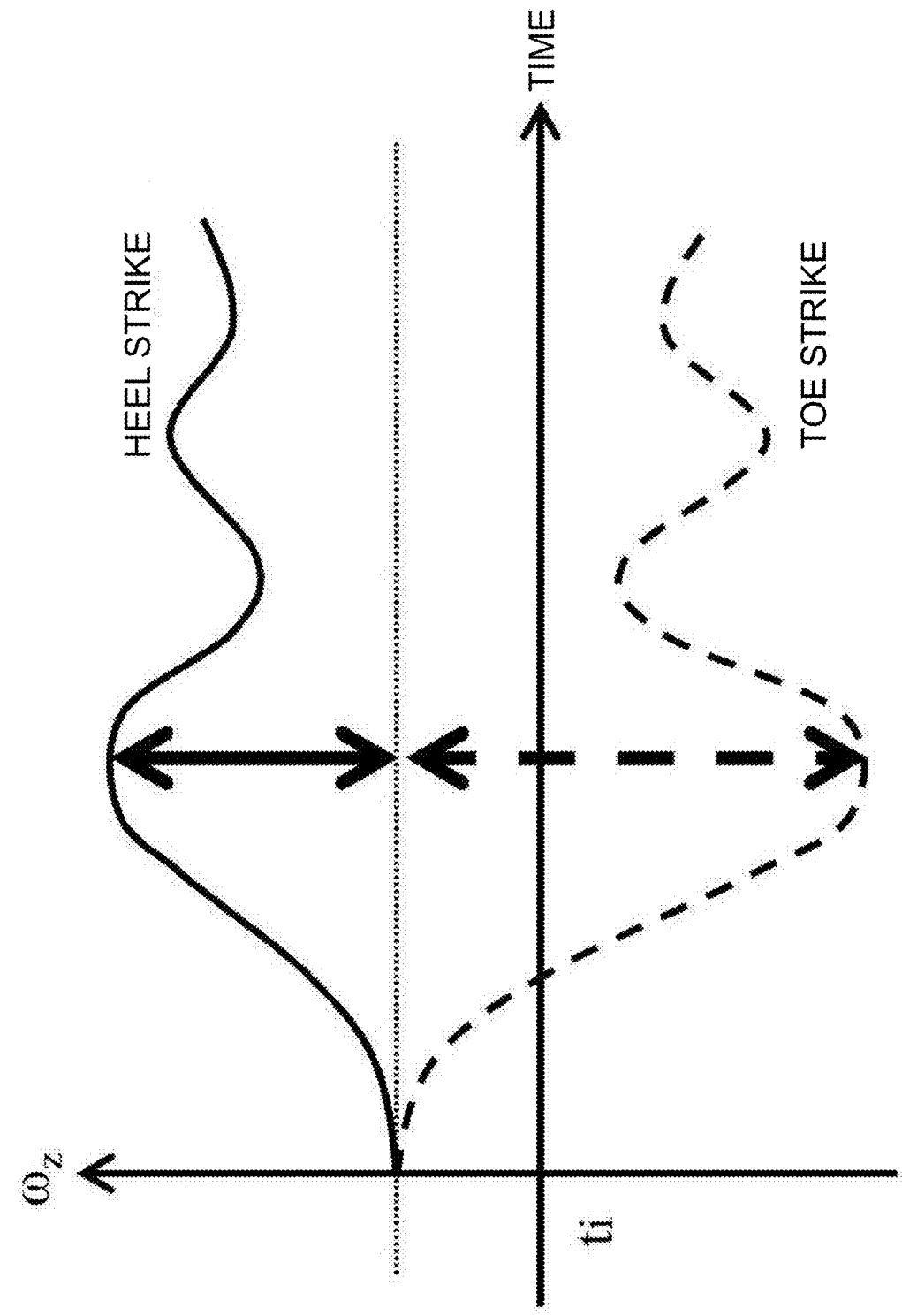

FIGS. 14A and 14B are diagrams illustrating the reason for calculating the above feature amount $C_{th}$, in order to specify the impact point $D_{th}$ in the toe-heel direction. That is, the inventors formed a hypothesis that when the ball 43 impacts at a position on the toe side of the face surface 51a, the shaft 40 rotates clockwise about the z-axis that slopes with respect to the toe-heel direction, and that conversely when the ball 43 impacts at a position on the heel side, the shaft 40 rotates counterclockwise about the z-axis (see FIG. 14A). Under this hypothesis, an output value $\omega_z$ of the angular velocity sensor 12 that is fixed to the shaft 40 takes a negative value having a larger absolute value the closer the ball 43 impacts at a position on the toe side, and the output value $\omega_z$ takes a larger positive value the closer the ball 43 impacts at a position on the heel side. When this is represented with a waveform of the angular velocity $\omega_z$, the result is as shown in FIG. 14B. Accordingly, the inventors considered that the amplitude of the angular velocity $\omega_z$ about a z-axis is correlated with the impact point $D_{th}$ in the toe-heel direction.

Figure 15:
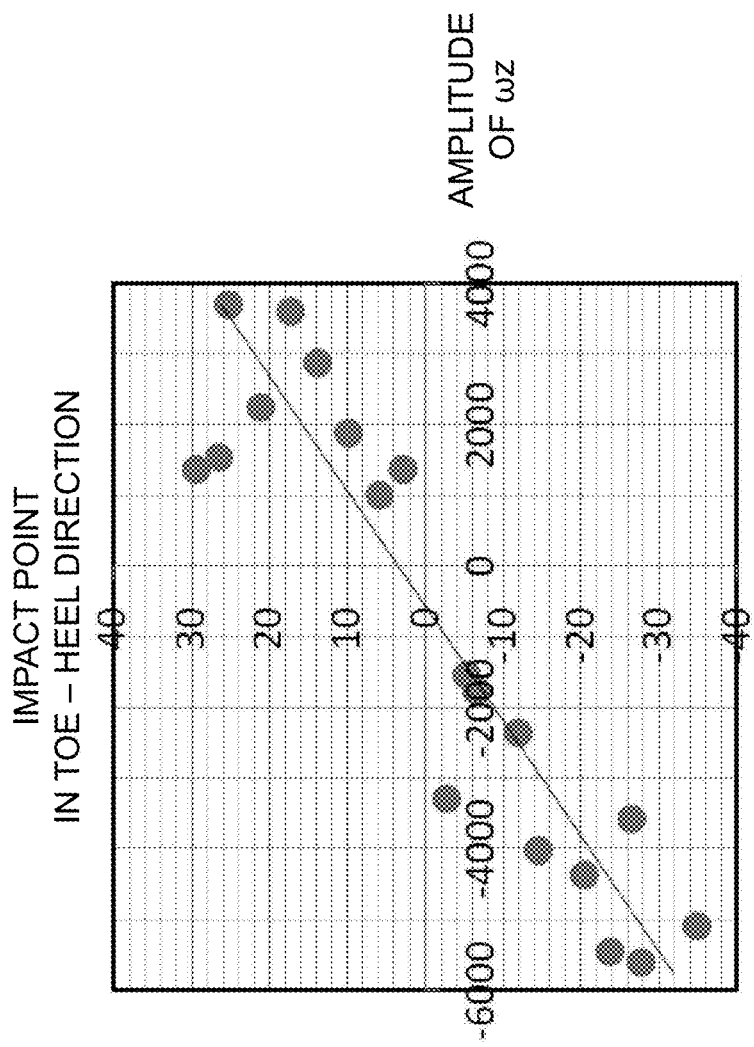
FIG. 15 is a graph showing the relationship between the impact point in the toe-heel direction and the amplitude of angular velocity about the z-axis.

The inventors verified the above hypothesis through testing. As a specific description, FIG. 15 is a graph obtained by making one golfer swing one golf club, collecting data at this time, and plotting this data in a plane whose vertical axis is the impact point $D_{th}$ and whose horizontal axis is the amplitude of the angular velocity $\omega_z$. More precisely, the horizontal axis is the amplitude at the peak of the angular velocity $\omega_z$ in the analysis period of step S12. Also, the impact point $D_{th}$ was determined by capturing an image of the golf swing using a plurality of cameras and performing image processing on the obtained image. Having calculated a correlation coefficient R of the impact point $D_{th}$ and the amplitude of the angular velocity $\omega_z$, a high value of R=0.9193 was obtained, confirming the probability of the hypothesis. The regression equation at this time was as shown in FIG. 15. As a result of the above verification, it was confirmed that the impact point $D_{th}$ in the toe-heel direction is a value that depends on the amplitude of the angular velocity $\omega_z$ immediately after impact, such as the feature amount $C_{th}$.

In the following step S14, the impact point specification unit 24B estimates the impact point $D_{th}$ in the toe-heel direction, according to the feature amount $C_{th}$ calculated at step S13. More specifically, in the present embodiment, the impact point $D_{th}$ is calculated, in accordance with the following equation in which the impact point $D_{th}$ is the objective variable and the feature amount $C_{th}$ is an explanatory variable.

$$D_{th}=k_1 \cdot C_{th}+k_2$$

Here, the coefficients $k_1$ and $k_2$ are the abovementioned coefficient data 28. The values of the coefficients $k_1$ and $k_2$ are the values of the coefficients of a regression equation determined in advance after having performed similar testing to the verification of FIG. 15 on the golf club 4, and are assumed to be stored in advance in the storage unit 23.

In the following step S15, the impact point specification unit 24B derives time series data (analysis data) of the angular velocity $\omega_x$ in an analysis period close to impact from the measurement data that is stored in the storage unit 23. An analysis period as referred to here is, in the present embodiment, a period from (time of impact $t_i+T_3$) to (time of impact $t_i+T_4$). For example, $T_3=5$ ms and is $T_4=10$ ms can be given. Note that the analysis period may include time of impact $t_i$ or a period prior to time of impact $t_i$.

In the following step S16, the impact point specification unit 24B calculates a feature amount $C_{ts}$ of the waveform of the analysis data of step S15 that is to be used in specifying an impact point $D_{ts}$ of the ball 43 on the face surface 51a in the top-sole direction. The feature amount $C_{ts}$ according to the present embodiment is a value obtained by subtracting time $t_{min}$ at which the amplitude is smallest from time $t_{max}$ at which the amplitude is largest in the waveform of the analysis data of step S15.

Figure 16A:
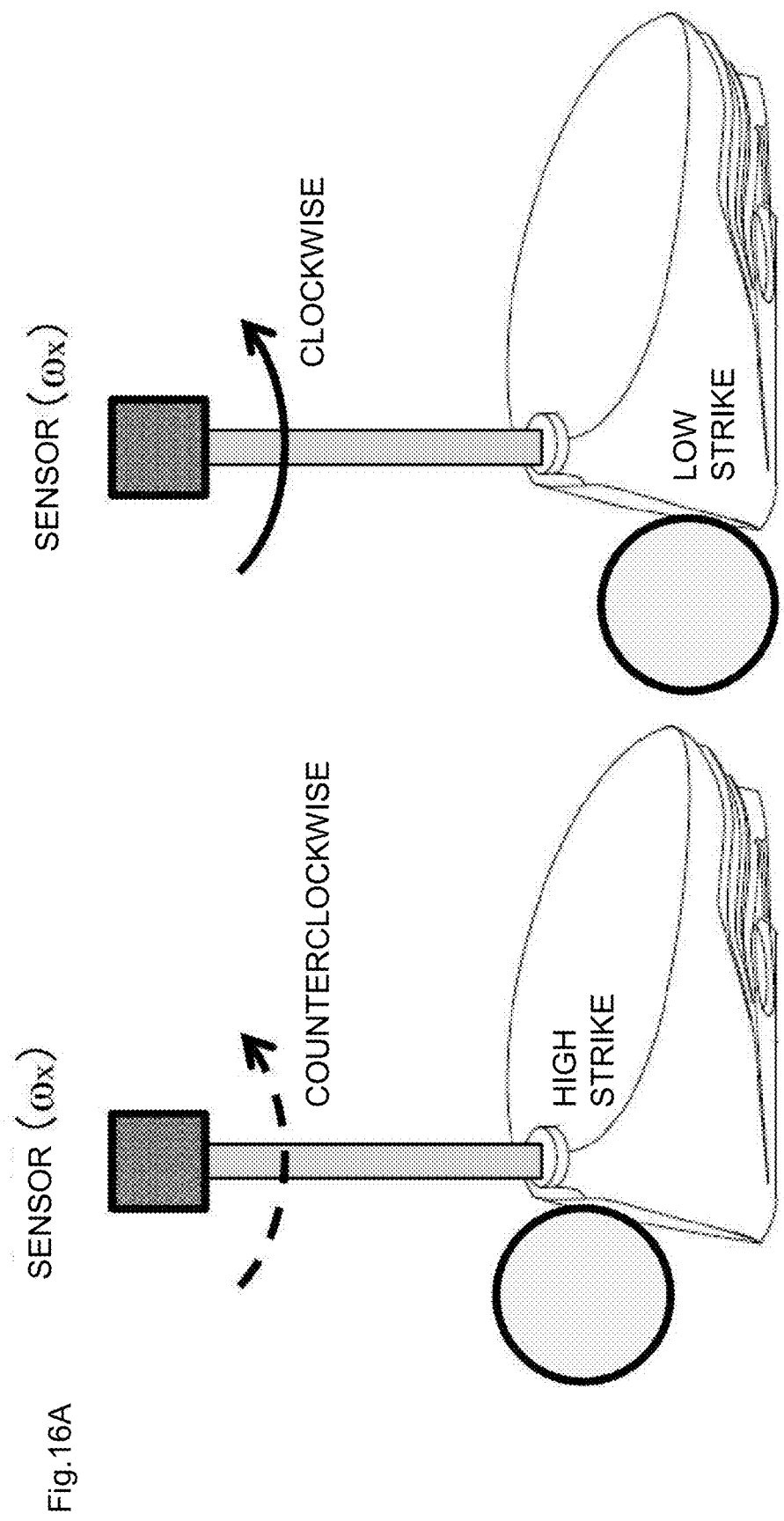
FIGS. 16A and 16B are diagrams illustrating the relationship between the impact point in the up-down direction and the period of angular velocity about the x-axis.
Figure 16B:
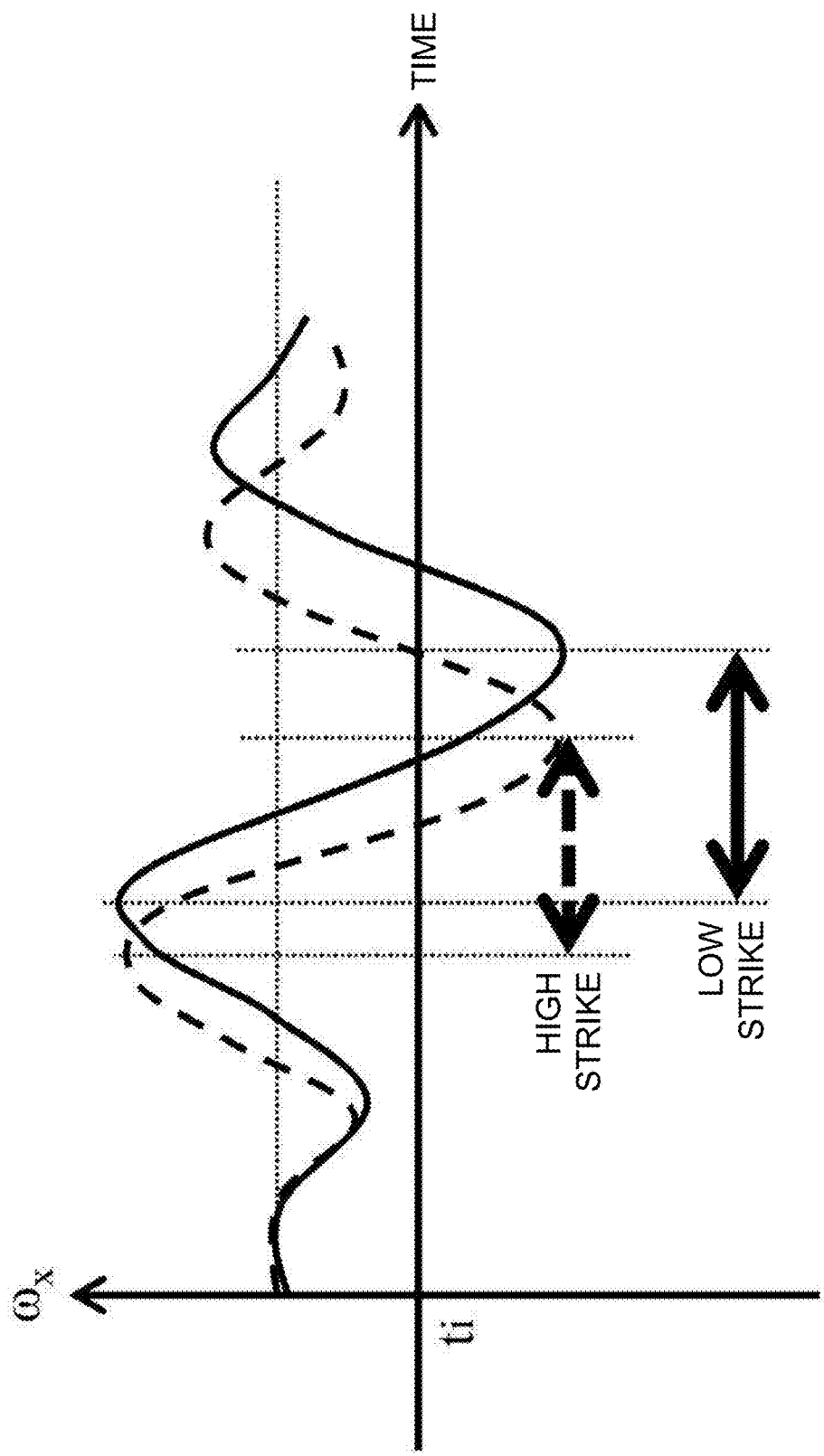

FIGS. 16A and 16B are diagrams illustrating the reason for calculating the feature amount $C_{ts}$, in order to specify the impact point $D_{ts}$ in the top-sole direction. The rotation about the x-axis of the grip 42 is thought to decelerate due to impact. On the other hand, the tip of the shaft 40 on the head 41 side is thought to flex (bend) counterclockwise due to impact (see FIG. 16A). That is, the inventors formed a hypothesis that a secondary flex mode occurs in the shaft 40 due to such behavior of the shaft 40. Under this hypothesis, the distance from the impact point to the sensor 12 will be shorter for an impact at a higher position on the face surface 51a than for an impact at a lower position. Accordingly, it is thought that, in this case, the mode frequency of the shaft 40 (beam) at impact will become higher, and the period of the waveform of the angular velocity $\omega_x$ about the x-axis that slopes (is roughly orthogonal) with respect to the top-sole direction will become shorter. When this is represented with the waveform of the angular velocity $\omega_x$, the result will be as shown in FIG. 16B. Accordingly, the inventors considered that the period of the waveform of the angular velocity $\omega_x$ about the x-axis or a length of time that is dependent thereon (hereinafter, for ease of understanding, this may be simply called a period) is correlated with the impact point $D_{ts}$ in the top-sole direction.

Figure 17:
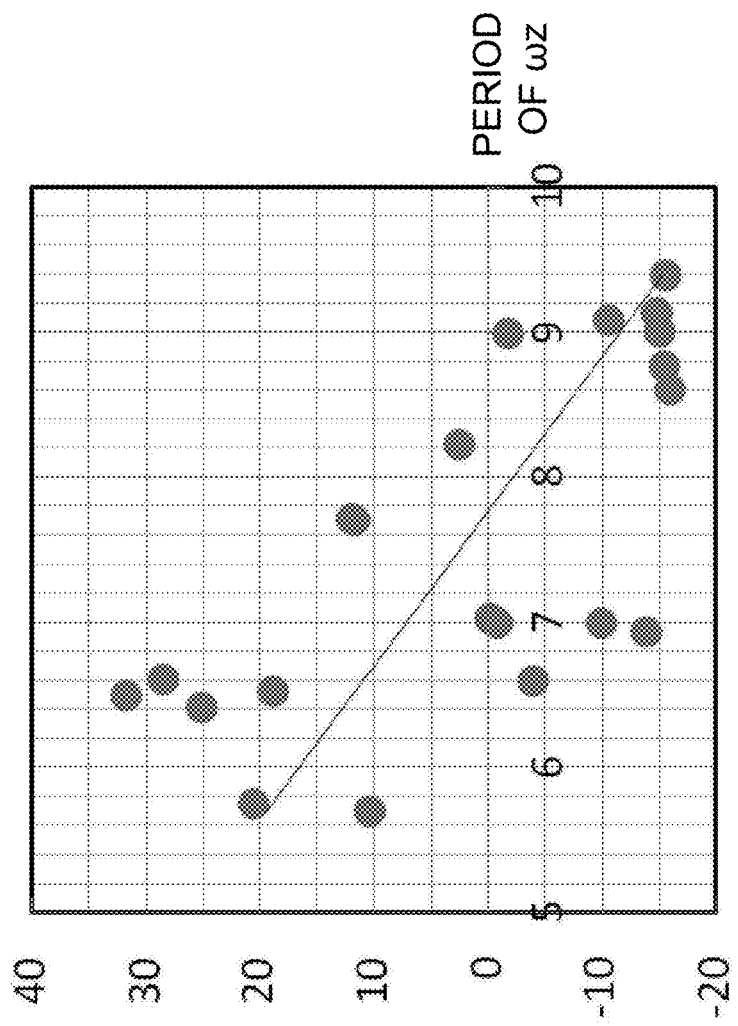
FIG. 17 is a graph showing the relationship between the impact point in the up-down direction and the period of angular velocity about the x-axis.

The inventors verified the above hypothesis though testing. As a specific description, FIG. 17 is a graph obtained by making one golfer swing one golf club, collecting data at this time, and plotting this data in a plane whose vertical axis is the impact point $D_{th}$ and whose horizontal axis is the period of the angular velocity $\omega_x$. More precisely, the horizontal axis is the time at which the smallest peak after impact is generated in the analysis period of step S6. Having calculated the correlation coefficient R of the impact point $D_{ts}$ and the period of the angular velocity $\omega_x$, a high value of R=0.7017 was obtained, confirming the probability of the above hypothesis. The regression equation at this time is as shown in FIG. 17. Also, the impact point $D_{ts}$ was calculated by a system using a plurality of cameras, similarly to the testing of FIG. 15. As a result of the above verification, it was confirmed that the impact point $D_{ts}$ in the top-sole direction is a value that depends on the period of the angular velocity $\omega_x$ immediately after impact, such as the above feature amount $C_{ts}$.

In the following step S17, the impact point estimation unit 24F estimates the impact point $D_{ts}$ in the top-sole direction, according to the feature amount $C_{ts}$ calculated at step S16. In the present embodiment, the impact point $D_{ts}$ is calculated, in accordance with the following equation in which the impact point $D_{ts}$ is the objective variable and the feature amount $C_{ts}$ is an explanatory variable.

$$D_{ts}=k_3 \cdot C_{ts}+k_4$$

Note that the coefficients $k_3$ and $k_4$ are the coefficient data 28 abovementioned. The values of the coefficients $k_3$ and $k_4$ are the values of the coefficients of a regression equation determined in advance after having performed similar testing to the verification of FIG. 17 on the golf club 4, and are assumed to be stored in advance in the storage unit 23. This ends the impact point estimation processing.

3. Variations

Although one embodiment of the present invention was described above, the present invention is not limited to the above embodiment, and various modifications can be made without departing from the spirit of the invention. For example, the following modifications can be made. Also, the gists of the following modifications can be combined as appropriate.

3-1

In the above embodiment, the sensor unit 1 is attached in the vicinity of the grip 42 of the shaft 40, but may be attached to the grip 42, or may be attached to an intermediate part of the shaft 40 or in the vicinity of the head 41. The sensor unit 1 is, however, preferably attached at a sufficient distance from the head 41, from the viewpoint of suppressing any effect the presence of the sensor unit 1 may have on the golf swing.

3-2

In the abovementioned embodiment, a sensor unit 1 having an acceleration sensor and an angular velocity sensor is used as the measurement device that measures the swing motion of the golfer 7, but the measurement device can also have other configurations. For example, one of the acceleration sensor and the angular velocity sensor can be omitted. Alternatively, a three-dimensional measurement camera can also be used as the measurement device. The impact point distribution DA can also be specified by such methods. The impact point distribution DA can also be specified while omitting the measurement device. In this case, it is sufficient to prompt the user to designate a position of the impact point distribution DA, via the display unit 21, for example. At this time, the position of the impact point distribution DA can be known by sticking pressure sensitive paper to the face surface and swinging the golf club 4.

3-3

The feature amounts $C_{th}$ and $C_{ts}$ for calculating the impact points $D_{th}$ and $D_{ts}$ are not limited to the abovementioned example. For example, acceleration data can be used instead of angular velocity data, as analysis data for deriving the feature amounts $C_{th}$, and $C_{ts}$. Also, the amplitude at the peak of the waveform of the angular velocity $w_y$ about the y-axis in the analysis period can be used as the feature amount $C_{th}$, or an integrated value of the angular velocity $\omega_y$ or $\omega_z$ of a predetermined analysis period after impact can be used instead of the amplitude at the peak. Also, as the feature amount $C_{th}$, the primary peak amplitude of the spectrum of the angular velocity $\omega_z$, the secondary peak amplitude of the spectrum of the acceleration $a_y$, the secondary peak amplitude of the spectrum of the angular velocity $\omega_x$, or the maximum value of the angular velocity $\omega_y$ immediately after impact (e.g., 0.1 sec after time $t_i$) can be used. On the other hand, as analysis data for deriving the feature amount $C_{ts}$, the angular velocity $\omega_y$ can also be used instead of the angular velocity $\omega_x$. Also, as the feature amount $C_{ts}$, the length of time from time of impact $t_i$ to the time at which the smallest peak is generated in the subsequent predetermined analysis period can be used. Further, as the feature amount $C_{ts}$, the secondary peak amplitude of the spectrum of the acceleration $a_y$, the secondary peak amplitude of the spectrum of the angular velocity $\omega_x$, the largest amplitude in a predetermined frequency band (in the vicinity of 50 to 100 Hz) of the spectrum of the acceleration $a_z$, and the maximum value of the angular velocity $\omega_y$ immediately after impact (e.g., 0.1 sec after time $t_i$) can also be used.

The impact point can also be estimated using a multiple regression equation in which various feature amounts are explanatory variables and the impact point is the objective variable, rather than a single regression equation as in the above embodiment. Also, although a linear regression equation was used as the regression equation for deriving the impact point, a nonlinear regression equation may be used. To evaluate the nonlinearity of the relationship between the impact point and the feature amount, the following methods can be used, for example.
(1) Provide a term of the power of N of a variable as an explanatory variable of a single regression equation or a multiple regression equation (N≥2).
(2) Build machine learning (neural network).

Also, the inventors focused on the stress wave that occurs due to impact and passes through the shaft 40 to the sensor unit 1 as an analysis target for performing impact point estimation at impact, and devised the following algorithm for estimating the impact points $D_{th}$ and $D_{ts}$. In particular, the inventors considered that analyzing the characteristics of the stress wave was facilitated by analyzing the waveform of the stress wave in an initial period of several milliseconds to 10 milliseconds after impact. This is because a large number of waves begin to interfere when such an initial period has passed, possibly making it difficult to capture the characteristics of the stress wave. The data of such an initial period is also superior in terms of being able to eliminate any effects arising from the golf club 4 touching the body of the golfer 7 at finish.

Figure 18:
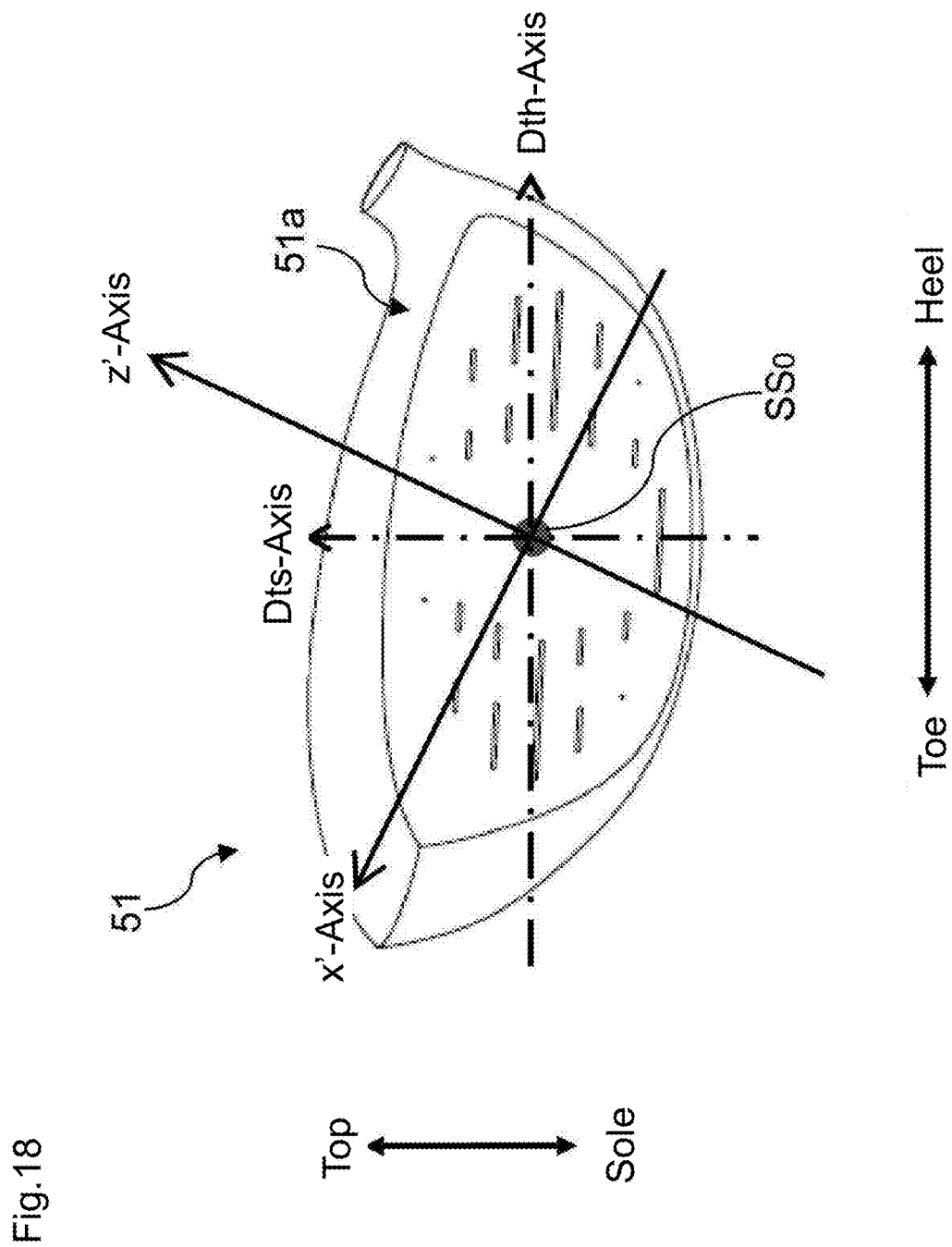
FIG. 18 is a diagram illustrating an x'-z' plane that is defined on the face surface of the head according to a variation.

Here, for convenience of description, an z'-x' plane is defined on the face surface 51a, as distinct from the above-mentioned $D_{th}$-$D_{ts}$ plane (see FIG. 18). The z'-x' plane is defined such that the z'-axis is parallel to the z-axis and the x'-axis is parallel to the x-axis, with its origin at the sweet spot SS. To be precise, the z'-x' plane is, however, defined on a surface obtained by projecting the face surface 51a onto a plane perpendicular to the y-axis.

At this time, if the impact point is within the first quadrant in the z'-x' plane, the head 41 rotates in the negative direction about the z'-axis and rotates in the positive direction about the x'-axis. If the impact point is in the second quadrant, the head 41 rotates in the negative direction about the z'-axis and rotates in the negative direction about the x'-axis. If the impact point is in the third quadrant, the head 41 rotates in the positive direction about the z'-axis and rotates in the negative direction about the x'-axis. If the impact point is in the fourth quadrant, the head 41 rotates in the positive direction about the z'-axis and rotates in the positive direction about the x'-axis.

When the head 41 rotates about the z'-axis, a stress wave caused by torsional deformation that depends on this rotation occurs in the shaft 40, and passing through the shaft 40 to reach the sensor unit 1 in the vicinity of the grip 42. Rotational movement that depends on this stress wave occurs in the sensor unit 1, and this rotational movement is detected with the angular velocity sensor 12 as the angular velocity $\omega_z'$ about the z'-axis. The angular velocity $\omega_z'$ is detected as a positive or negative value according to the rotation direction about the z'-axis. Also, the size of the angular velocity $\omega_z'$ is substantially proportional to the distance from the z'-axis to the impact point.

On the other hand, when the head 41 rotates about the x'-axis, the stress wave caused by bending deformation about the x'-axis that depends on the rotation occurs in the shaft 40, and passes through the shaft 40 to reach the sensor unit 1 in the vicinity of the grip 42. Rotational movement that depends on this stress wave occurs in the sensor unit 1, and this rotational movement is detected with the angular velocity sensor 12 as the angular velocity $\omega_x'$ about the x'-axis. However, unlike the rotation of the head 41 about the z'-axis, bending deformation will occur in the shaft 40 close to the head 41, even if the impact point is SS and the head 41 does not rotate, since the head 41 decelerates relative to the movement of the shaft 40. In other words, there is no change in the sign of the angular velocity $\omega_x'$ with respect to the impact point being at the sweet spot SS. However, since the amplitude of the stress wave will be substantially proportional to the distance from the x'-axis to the impact point, the angular velocity $\omega_x'$ that is detected with the angular velocity sensor 12 is also substantially proportional to the distance from the x'-axis to the impact point.

From the above, the inventors considered that the impact point can be estimated by measuring the angular velocities $\omega_x'$ and $\omega_z'$ under the influence of the stress wave of the initial period after impact. In order to verify this, the inventors performed simulation.

Also, the amplitudes of the angular velocities $\omega_x'$ and $\omega_z'$ are each dependent on the reaction force that occurs when the head 41 impacts the ball 43, and are substantially proportional to the head speed. Accordingly, the inventors considered that the impact point can be estimated with higher accuracy if an index affecting the reaction force that occurs when the head 41 impacts the ball 43, such as head speed, is known.

Figure 19:
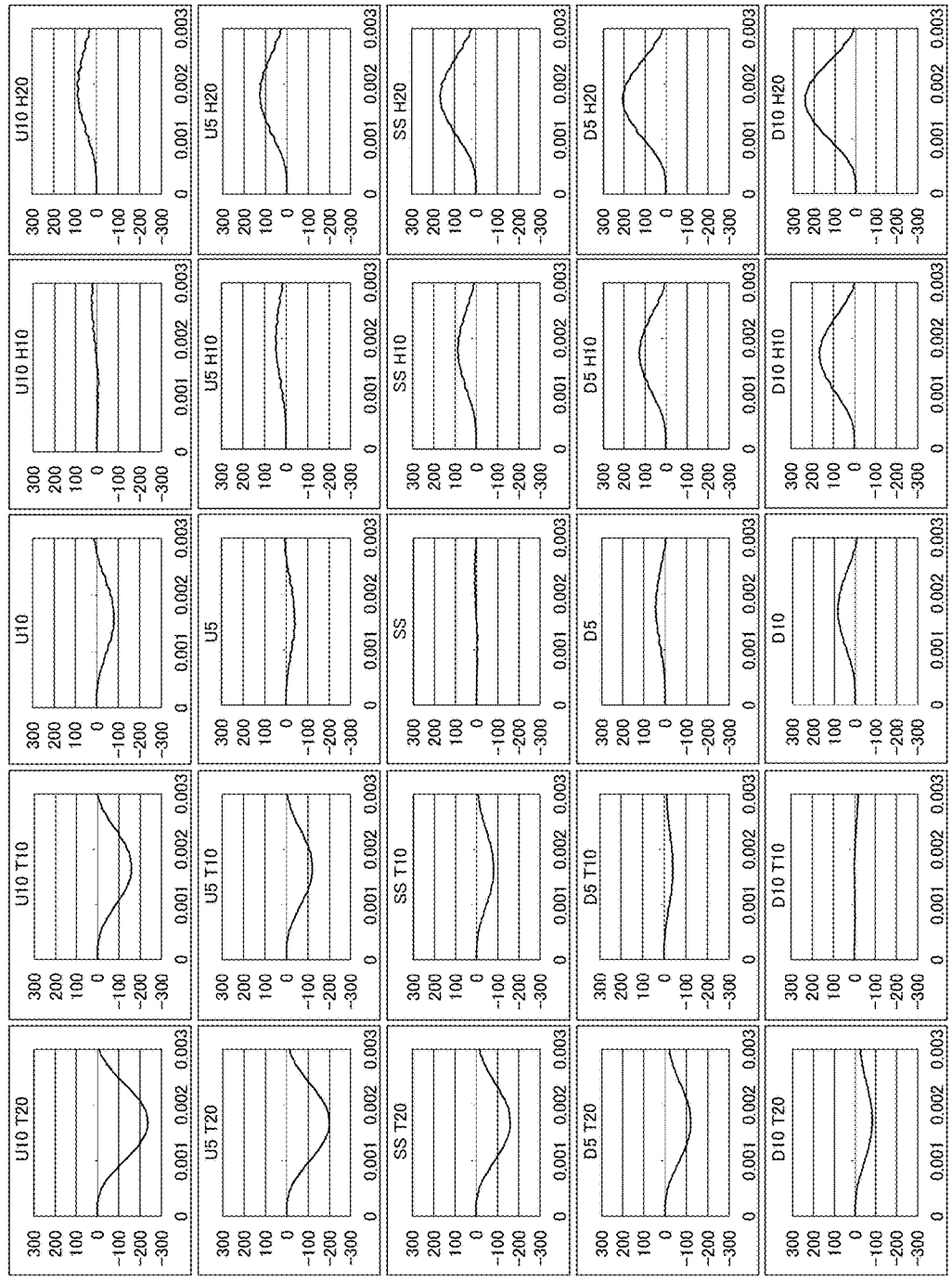
FIG. 19 is a series of graphs showing the results of simulating an angular velocity $\omega_z'$ under the influence of a stress wave at various impact points.

FIG. 19 is a series of graphs of the angular velocity $\omega_z'$ at various impact points derived by simulation. The unit of the vertical axis of the graphs is deg/s, and the horizontal axis is time and represents the period from impact to 0.003 seconds. This simulation was performed with the head speed at impact set to 40 m/s. Also, the middle graph is a graph when the impact point is at the sweet spot SS. With reference to this graph, the graph that is one place to the right is a graph when the impact point was set to a position that is 10 mm to the heel side from the sweet spot SS, and the graph that is two places to the right is a graph when the impact point was set to a position that is 20 mm to the heel side from the sweet spot SS. Similarly, the graph that is one place to the left is a graph when the impact point was set to a position that is 10 mm to the toe side from the sweet spot SS, and the graph that is two places to the left is a graph when the impact point was set to a position that is 20 mm to the toe side from the sweet spot SS. Also, with reference to the graph of the sweet spot SS, the graph that is one place up is a graph when the impact point was set to a position that is 5 mm upward from the sweet spot SS, and the graph that is two places up is a graph when the impact point was set to a position that is 10 mm upward from the sweet spot SS. Similarly, the graph that is one place down is a graph when the impact point was set to a position that is 5 mm downward from the sweet spot SS, and the graph that is two places down is a graph when the impact point was set to a position that is 10 mm downward from the sweet spot SS.

It is evident from FIG. 19 that a peak of $\omega_z'$ is hardly detected when the impact point is at the sweet spot SS, and that a larger positive peak of $\omega_z'$ is detected as the impact point moves to the heel side and a larger negative peak of $\omega_z'$ is detected as the impact point moves to the toe side. Also, it is evident that, in the region on the toe side, a larger negative peak is detected as the impact point moves up, and that, in the region on the heel side, a larger positive peak is detected as the impact point moves down. Accordingly, it is evident that the impact points $D_{th}$ and $D_{ts}$ are each correlated with $\omega_z'$.

Figure 20:
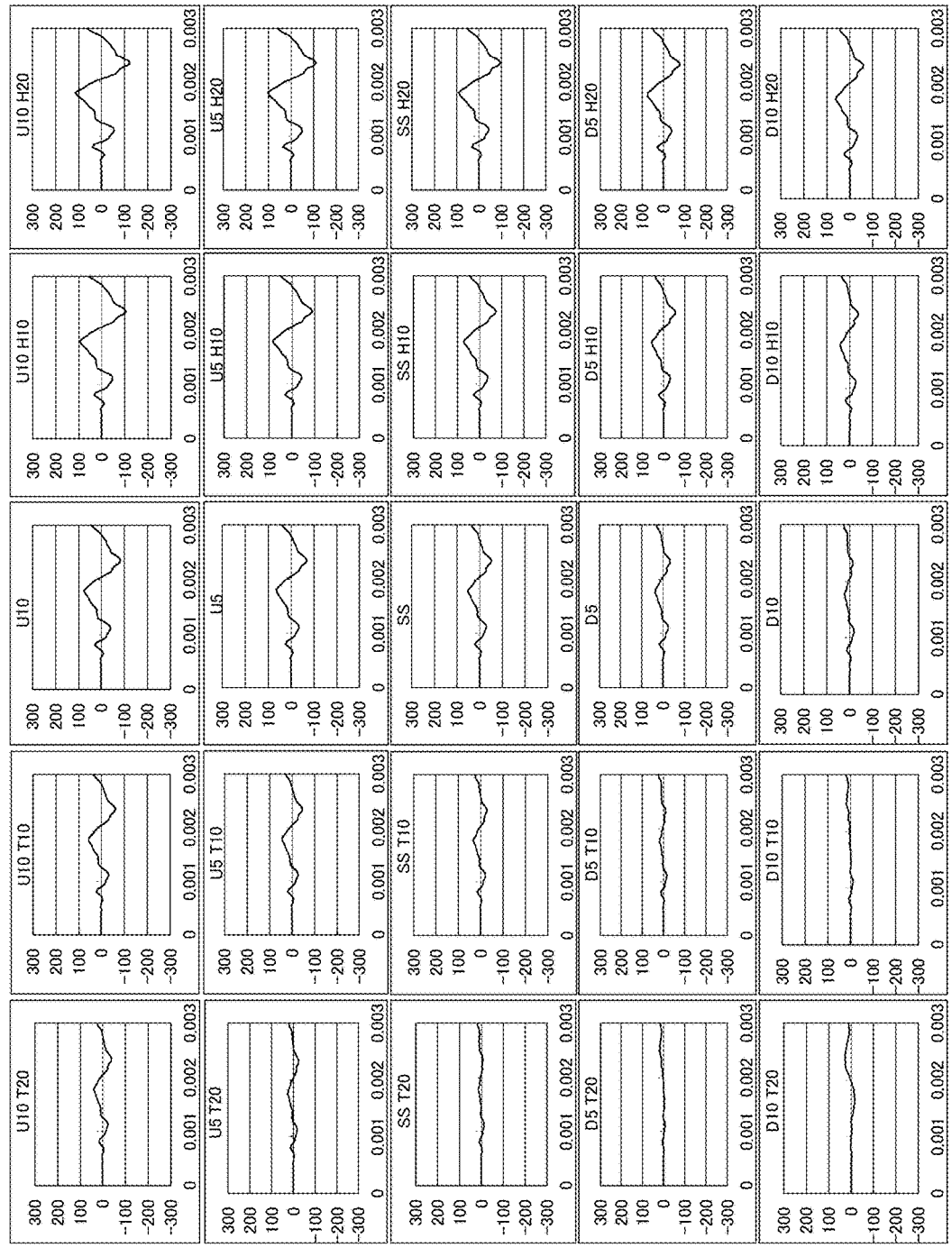
FIG. 20 is a series of graphs showing the results of simulating an angular velocity $\omega_x'$ under the influence of a stress wave at various impact points.

FIG. 20 is a series of graphs of the angular velocity $\omega_x'$ at various impact points derived by simulation. Similarly to the case of the angular velocity $\omega_z'$, the unit of the vertical axis of the graphs is deg/s, and the horizontal axis is time and represents the period from impact to 0.003 second. This simulation was performed with the head speed at impact set to 40 m/s. Also, the middle graph is a graph when the impact point is at the sweet spot SS. With reference to this graph, the graph that is one place to the right is a graph when the impact point was set to a position that is 10 mm to the heel side from the sweet spot SS, and the graph that is two places to the right is a graph when the impact point was set to a position that is 20 mm to the heel side from the sweet spot SS. Similarly, the graph that is one place to the left is a graph when the impact point was set to a position that is 10 mm to the toe side from the sweet spot SS, and the graph that is two places to the left is a graph when the impact point was set to a position that is 20 mm to the toe side from the sweet spot SS. Also, with reference to the graph of the sweet spot SS, the graph that is one place up is a graph when the impact point was set to a position that is 5 mm upward from the sweet spot SS, and the graph that is two places up is a graph when the impact point was set to a position that is 10 mm upward from the sweet spot SS. Similarly, the graph that is one place down is a graph when the impact point was set to a position that is 5 mm downward from the sweet spot SS, and the graph that is two places down is a graph when the impact point was set to a position that is 10 mm downward from the sweet spot SS.

It is evident from FIG. 20 that a larger positive peak of $\omega_x'$ is detected as the impact point moves to the heel side and a smaller positive peak of $\omega_x'$ is detected as the impact point moves to the toe side. Also, it is evident that a larger peak is detected as the impact point moves up, and that a smaller peak is detected as the impact point moves down. Accordingly, it is evident that the impact points $D_{th}$ and $D_{ts}$ are each correlated with $\omega_x'$.

Figure 21:
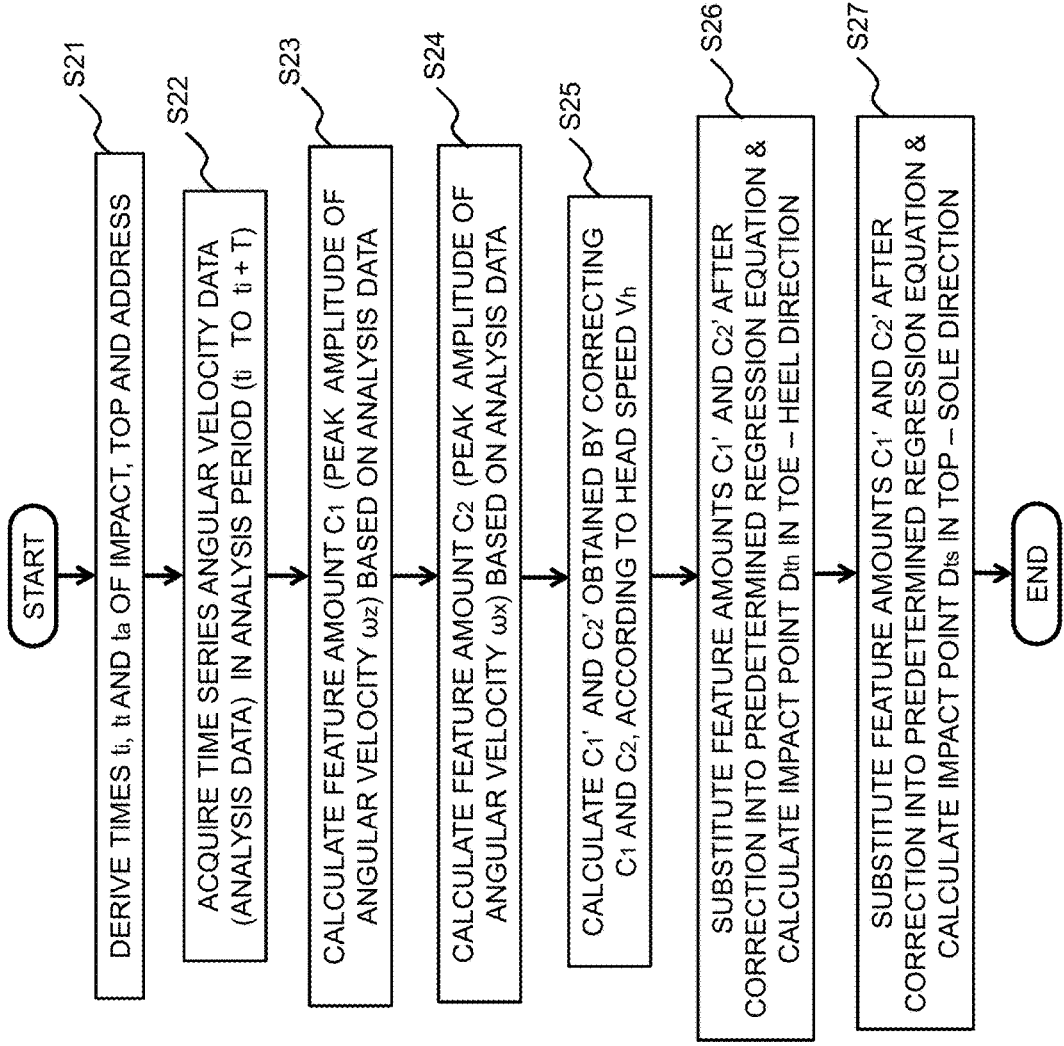
FIG. 21 is a flowchart showing the flow of impact point estimation processing according to a variation.

It is evident from the results of the above simulation that estimation of the impact points $D_{th}$ and $D_{ts}$ is possible if the values of the angular velocities $\omega_x'$ and $\omega_x'$ or $\omega_x$ and $\omega_z$ are known. FIG. 21 shows a flowchart showing the flow of impact point estimation processing that is based on this knowledge.

In the impact point estimation processing of FIG. 21, the impact point specification unit 24B, in the initial step S21, derives times $t_i$, $t_t$ and $t_a$ of impact, top and address based on measurement data, similarly to step S11.

In the following step S22, the impact point specification unit 24B derives time series data (analysis data) of the angular velocities $\omega_x$ and $\omega_z$ in the analysis period from the measurement data that is stored in the storage unit 23. The analysis period as referred to here is a period including the initial period after impact, and, in the present embodiment, is a period from time of impact $t_i$ to (time of impact $t_i$+T). Note that 0 sec<T≤0.01 sec is preferable, 0 sec<T≤0.005 sec is more preferable, and 0 sec<T≤0.003 sec is still more preferable, In such an analysis period, only the first wave of the stress wave that occurs due to impact appears, or up to around the third wave at most. That is, the angular velocity data of the above analysis period is data representing the characteristics of the stress wave before a large number of waves cause interference. Note that the initial period of the analysis period need not be time of impact $t_i$, and the analysis period can, for example, be set to (time of impact $t_i$+$T_0$) to (time of impact $t_i$+T). Note that 0<$T_0$<T. The analysis period can also be set such that only a period after time of impact $t_i$ is included, or such that a period before time of impact $t_i$ is included. Note that in the measurement data obtained when a club is actually swung, the data of the angular velocities $\omega_x'$ and $\omega_z'$ of the stress wave caused by impact is superimposed on the data of the angular velocities resulting from the swing from address to finish. Accordingly, in deriving analysis data, it is preferable to extract the data of the stress wave, which is a high frequency component, by applying a highpass filter to the measurement data. The characteristics of the angular velocities $\omega_x'$ and $\omega_z'$ of the stress wave caused by impact can thereby be evaluated with higher accuracy. It is, however, also possible to evaluate the characteristics of the angular velocities $\omega_x'$ and $\omega_z'$ of the stress wave resulting from impact, by directly evaluating $\omega_x$ and $\omega_z$. In this sense, hereinafter, the data of the angular velocities $\omega_x$ and $\omega_z$ after passing through the highpass filter is represented using $\omega_x$ and $\omega_z$, rather than $\omega_x'$ and $\omega_z'$.

In the following step S23, the impact point specification unit 24B calculates a feature amount $C_1$ based on the analysis data derived at step S22. The feature amount $C_1$ is an index that is dependent on the impact point, and represents the characteristics of the initial stress wave that occurs due to impact, and, in the present embodiment, is the maximum value or the minimum value (peak amplitude) of the angular velocity $\omega_z$ in the analysis period.

Similarly, in the following step S24, the impact point specification unit 24B calculates a feature amount $C_2$, based on the analysis data derived at step S22. The feature amount $C_2$ is an index that is dependent on the impact point, and represents the characteristics of the early stress wave that occurs due to impact, and, in the present embodiment, is also the maximum value or the minimum value (peak amplitude) of the angular velocity $\omega_x$ in the analysis period.

In the following step S25, the impact point specification unit 24B corrects the feature amounts $C_1$ and $C_2$ calculated at steps S23 and S24, according to a head speed $V_h$ at impact. This correction is processing for respectively calculating, from the feature amounts $C_1$ and $C_2$, the feature amounts $C_1'$ and $C_2'$ from which the influence of the magnitude of the head speed $V_h$ has been canceled. That is, at step S25, the feature amounts $C_1$ and $C_2$ are converted into feature amounts $C_1'$ and $C_2'$ in the case where the head speed $V_r$ serving as a reference is exhibited. In the present embodiment, the feature amounts $C_1'$ and $C_2'$ are calculated, in accordance with the following equations. Note that since there are various known algorithms for calculating the head speed $V_h$, a detailed description is omitted here.

$$C_1' = (V_r/V_h)C_1$$

$$C_2' = (V_r/V_h)C_2$$

In the following step S26, the impact point specification unit 24B estimates the impact point $D_{th}$ on the face surface 51a in the toe-heel direction, according to the feature amounts $C_1'$ and $C_2'$ after correction. More specifically, in the present embodiment, the impact point $D_{th}$ is calculated, in accordance with the following equation in which the impact point $D_{th}$ is the objective variable and the feature amounts $C_1'$ and $C_2'$ are explanatory variables.

$$D_{th} = k_{th0} + k_{th1} \cdot C_1' + k_{th2} \cdot C_2'$$

Here, $k_{th0}$, $k_{th1}$ and $k_{th2}$ are constants and are the abovementioned coefficient data 28. As described above, according to the simulation performed by the inventors, the impact point $D_{th}$ is correlated with the feature amounts $C_1'$ and $C_2'$. Accordingly, $k_{th0}$, $k_{th1}$ and $k_{th2}$ can be set in advance, through performing multiple regression analysis on a large number of data sets ($D_{th}$, $C_1'$, $C_2'$) that are obtained by simulation or testing.

Similarly, in the following step S27, the impact point specification unit 24B estimates the impact point $D_{ts}$ of the ball 43 on the face surface 51a in the top-sole direction, according to the feature amounts $C_1'$ and $C_2'$ after correction. More specifically, in the present embodiment, the impact point $D_{ts}$ is calculated, in accordance with the following equation in which the impact point $D_{ts}$ is the objective variable and the feature amounts $C_1'$ and $C_2'$ are explanatory variables.

$$D_{ts} k_{ts0} + k_{ts1} \cdot C_1' + k_{ts2} \cdot C_2'$$

Here, $k_{ts0}$, $k_{ts1}$ and $k_{ts2}$ are constants, and are the abovementioned coefficient data 28. As described above, according to the simulation performed by the inventors, the impact point $D_{ts}$ is also correlated with the feature amounts $C_1'$ and $C_2'$. Accordingly, $k_{ts0}$, $k_{ts1}$ and $k_{ts2}$ can be set in advance through preparing a large number of data sets ($D_{ts}$, $C_1'$, $C_2'$) by simulation or testing, and performing multiple regression analysis on these data sets.

3-4

Figure 22:
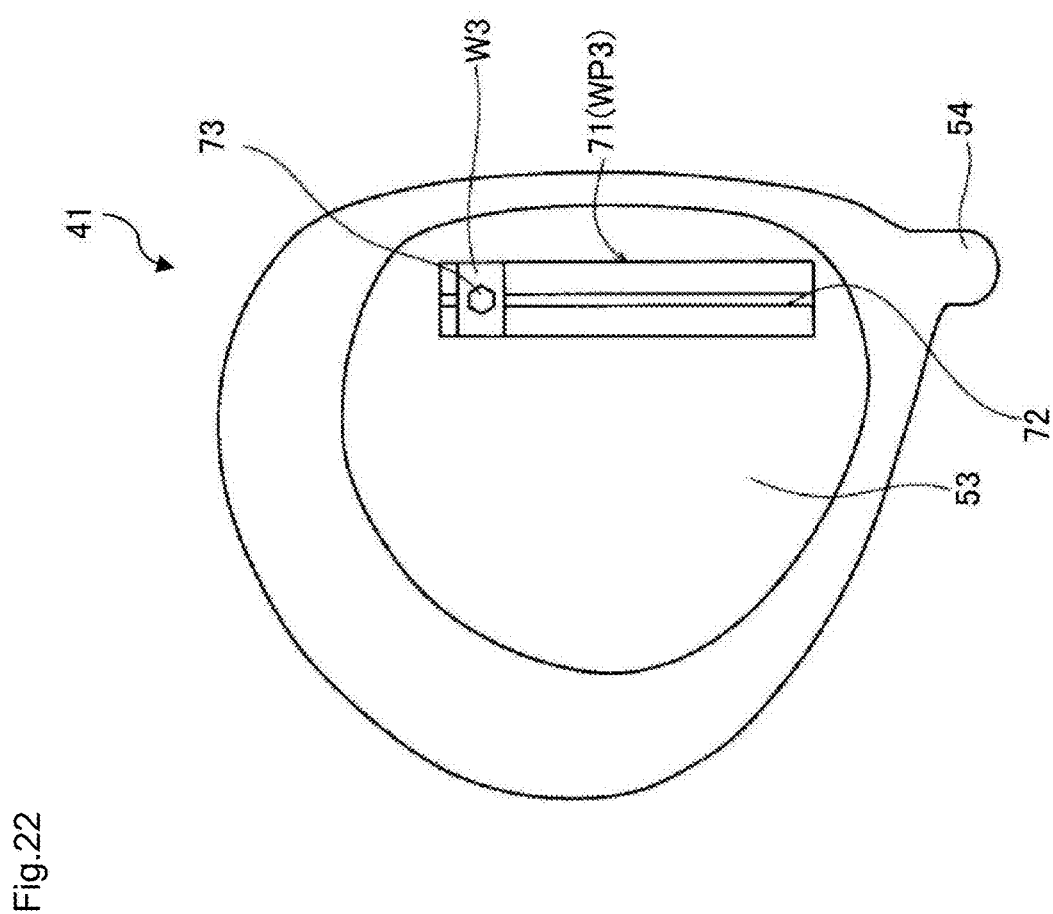
FIG. 22 is a diagram showing the head according to a variation.

As already mentioned, the mechanism for mounting the weights in the head is not particularly limited, and may, for example, be a slide mechanism as shown in FIG. 22, rather than a detachable mechanism such as described in the abovementioned embodiment. In the example of FIG. 22, a slide slot 71 (weight port WP3) extending in the toe-heel direction is formed in the sole 53 of the head 41, and a slide rail 72 similarly extending in the toe-heel direction is arranged within this slide slot 71. The weight W3 is configured so as to be able to move in the toe-heel direction along the slide rail 72 within the slide slot 71. The weight W3 can be fixed at various positions along the slide rail 72 in a continuous or stepwise manner, via a screw 73 and a nut member that is not illustrated, for example. Such a slide mechanism for mounting the weights can also be formed in regions other than the sole 53, such as in the crown 52, for example. Also, a slide slot 71 and a slide rail 72 that extend in an arbitrary direction, such as in the up-down direction or the face-back direction, for example, can also be formed, rather than being limited to the toe-heel direction.

REFERENCE SIGNS LIST

1 Sensor unit (measurement device)
11 Acceleration sensor
12 Angular velocity sensor
2 Weight pattern determination/recommendation apparatus
24A Data acquisition unit
24B Impact point specification unit
24C Pattern determination unit
24D Display control unit
24D1 First display control unit
24D2 Second display control unit
24D3 Third display control unit
29 Sweet area specification information
4 Golf club
41 Head
7 Golfer
DA Impact point distribution
SA Sweet area
SS Sweet spot
W1-W4 Weight
R1-R3 Screen

The invention claimed is:

1. A weight pattern determination apparatus configured to determine, in a golf club having a head capable of mounting one or more weights in a plurality of mounting patterns, the mounting pattern suited to a golfer, the apparatus comprising:
   a data acquisition unit of a computer configured to acquire measurement data obtained by measuring a swing motion of the golf club by the golfer using a measurement device, the measurement device including at least one of an angular velocity sensor and an acceleration sensor attached to the golf club;
   an impact point specification unit of the computer configured to calculate a feature amount of a waveform of the measurement data, estimate impact points on the head according to the feature amount, and specify an impact point distribution of the golfer; and
   a pattern determination unit of the computer configured to determine a recommended pattern which is the mounting pattern that approximates a sweet area of the golf club to the impact point distribution, the recommended pattern being such a pattern that a position of the sweet area in the head is moved closer to the impact point distribution if the one or more weights are mounted in the head with the recommended pattern.

2. The weight pattern determination apparatus according to claim 1,
   wherein the impact point specification unit is configured to specify the impact point distribution, based on the measurement data.

3. The weight pattern determination apparatus according to claim 2,
   wherein the measurement device includes at least one of an angular velocity sensor and an acceleration sensor attached to the golf club.

4. The weight pattern determination apparatus according to claim 1,
   wherein the impact point specification unit is configured to calculate a feature amount of the impact point distribution, and the pattern determination unit is configured to determine the recommended pattern, based on the feature amount.

5. The weight pattern determination apparatus according to claim 2,
wherein the impact point specification unit is configured to calculate a feature amount of the impact point distribution, and
the pattern determination unit is configured to determine the recommended pattern, based on the feature amount.

6. The weight pattern determination apparatus according to claim 3,
wherein the impact point specification unit is configured to calculate a feature amount of the impact point distribution, and
the pattern determination unit is configured to determine the recommended pattern, based on the feature amount.

7. The weight pattern determination apparatus according to claim 4,
wherein the feature amount includes at least one of a position of the impact point distribution in a toe-heel direction, a position of the impact point distribution in an up-down direction, and a slope of the impact point distribution.

8. The weight pattern determination apparatus according to claim 5,
wherein the feature amount includes at least one of a position of the impact point distribution in a toe-heel direction, a position of the impact point distribution in an up-down direction, and a slope of the impact point distribution.

9. The weight pattern determination apparatus according to claim 6,
wherein the feature amount includes at least one of a position of the impact point distribution in a toe-heel direction, a position of the impact point distribution in an up-down direction, and a slope of the impact point distribution.

10. The weight pattern determination apparatus according to claim 1,
wherein the pattern determination unit is configured to determine the recommended pattern, with reference to predetermined information for specifying, with regard to each of the plurality of mounting patterns, a position of the sweet area in a case where the mounting pattern is applied.

11. The weight pattern determination apparatus according to claim 2,
wherein the pattern determination unit is configured to determine the recommended pattern, with reference to predetermined information for specifying, with regard to each of the plurality of mounting patterns, a position of the sweet area in a case where the mounting pattern is applied.

12. The weight pattern determination apparatus according to claim 3,
wherein the pattern determination unit is configured to determine the recommended pattern, with reference to predetermined information for specifying, with regard to each of the plurality of mounting patterns, a position of the sweet area in a case where the mounting pattern is applied.

13. The weight pattern determination apparatus according to claim 1, further comprising:
a display control unit of the computer configured to display, on a display unit, a screen illustrating the head in a state in which the one or more weights are arranged as per the recommended pattern.

14. The weight pattern determination apparatus according to claim 1, further comprising:
a display control unit of the computer configured to display, on a display unit, a screen illustrating the head, a position of the impact point distribution on the head and a position of the sweet area in a case where the recommended pattern is applied.

15. A weight pattern recommendation apparatus configured to recommend, in a golf club having a head capable of mounting one or more weights in a plurality of mounting patterns, the mounting pattern suited to a golfer, the apparatus comprising:
a data acquisition unit of a computer configured to acquire measurement data obtained by measuring a swing motion of the golf club by the golfer using a measurement device, the measurement device including at least one of an angular velocity sensor and an acceleration sensor attached to the golf club;
an impact point specification unit of the computer configured to calculate a feature amount of a waveform of the measurement data, estimate impact points on the head according to the feature amount, and specify an impact point distribution of the golfer based on the estimated impact point;
a first display control unit of the computer configured to display, on a display unit, a first diagram illustrating a position of an impact point distribution of the golfer on the head; and
a second display control unit of the computer configured to display, on the display unit, a second diagram illustrating the head in which the one or more weights are arranged as per a recommended pattern which is the mounting pattern that approximates a sweet area of the golf club to the impact point distribution, the recommended pattern being such a pattern that a position of the sweet area in the head is moved closer to the impact point distribution if the one or more weights are mounted in the head with the recommended pattern.

16. The weight pattern recommendation apparatus according to claim 15,
wherein the first display control unit and the second display control unit are configured to overlay and display the first diagram and the second diagram on a same screen.

17. The weight pattern recommendation apparatus according to claim 15, further comprising:
a third display control unit of the computer configured to display, on the display unit, a third diagram illustrating a position of the sweet area in a case where the recommended pattern in the head is applied.

18. The weight pattern recommendation apparatus according to claim 17,
wherein the first display control unit and the third display control unit are configured to overlay and display the first diagram and the third diagram on the same screen.

19. A non-transitory computer readable medium storing a weight pattern determination program for determining, in a golf club having a head capable of mounting one or more weights in a plurality of mounting patterns, the mounting pattern suited to a golfer, the program causing a computer to execute the steps of:
acquiring measurement data obtained by measuring a swing motion of the golf club by the golfer using a measurement device, the measurement device including at least one of an angular velocity sensor and an acceleration sensor attached to the golf club;

calculating a feature amount of a waveform of the measurement data;

estimating impact points on the head according to the feature amount;

specifying an impact point distribution of the golfer based on the estimated impact point; and determining a recommended pattern which is the mounting pattern that approximates a sweet area of the golf club to the impact point distribution, based on the impact point distribution, the recommended pattern being such a pattern that a position of the sweet area in the head is moved closer to the impact point distribution if the one or more weights are mounted in the head with the recommended pattern.

20. A weight pattern determination method for determining, in a golf club having a head capable of mounting one or more weights in a plurality of mounting patterns, the mounting pattern suited to a golfer, the method comprising the steps of:

specifying an impact point distribution of the golfer; and determining a recommended pattern which is the mounting pattern that approximates a sweet area of the golf club to the impact point distribution, based on the impact point distribution, the recommended pattern being such a pattern that a position of the sweet area in the head is moved closer to the impact point distribution if the one or more weights are mounted in the head with the recommended pattern; and mounting the one or more weights in the head according to the recommended pattern.

* * * * *